United States Patent
Tai et al.

(10) Patent No.: US 6,686,011 B1
(45) Date of Patent: Feb. 3, 2004

(54) COINJECTION STRETCH-BLOW MOLDED CONTAINER

(75) Inventors: Shinji Tai, Kurashiki (JP); Hiroyuki Shimo, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/680,966

(22) Filed: Oct. 6, 2000

(30) Foreign Application Priority Data

Jan. 28, 2000 (JP) .................................... 2000-019587

(51) Int. Cl.[7] .................................................. B32B 27/08
(52) U.S. Cl. ...................................... 428/36.6; 428/483
(58) Field of Search .............................. 428/36.6, 483

(56) References Cited

U.S. PATENT DOCUMENTS

| | | | |
|---|---|---|---|
| 4,349,644 A | 9/1982 | Iwanami et al. | 525/57 |
| 4,590,131 A | 5/1986 | Yazaki et al. | 428/516 |
| 4,798,697 A | 1/1989 | Nohara et al. | 264/255 |
| 4,855,181 A | 8/1989 | Shimo et al. | 428/336 |
| 4,904,509 A * | 2/1990 | Nohara et al. | 428/36.6 |
| 5,972,447 A | 10/1999 | Hata et al. | 428/35.7 |
| 6,033,749 A | 3/2000 | Hata et al. | 428/36.7 |
| 6,294,602 B1 | 9/2001 | Shimo et al. | 524/394 |

FOREIGN PATENT DOCUMENTS

| | | |
|---|---|---|
| CA | 2267878 | 3/1999 |
| EP | 0 949 056 | 10/1999 |
| JP | 60-161447 | 8/1985 |
| JP | 63-230757 | 9/1988 |
| JP | 63-264656 | 11/1988 |
| JP | 1-204736 | 8/1989 |
| JP | 3-112654 | 5/1991 |
| JP | 3-175033 | 7/1991 |
| JP | 11-348196 | 12/1999 |

OTHER PUBLICATIONS

EPO Form 2906 01.91CSX, European Communication pursant to Article 96(2) EPC, Application No. 01 101 650.8–1253, Oct. 4, 2002 Cover sheet and pp. 1–4, referring to EP–A–0949056 and US–A–4590131.

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

Multi-layered, coinjection stretch-blow molded containers are obtained by stretch-blow molding a preform prepared by coinjection molding a polyester resin and an EVOH resin blend in which one of the EVOH resins is dispersed as particles in an EVOH resin matrix. Containers prepared with this EVOH blend have good impact delamination resistance, good gas-barrier properties, and high transparency is high, even without an adhesive layer. The EVOH blend is composed of two EVOH resins having different ethylene contents and degrees of saponification. The blend exhibits at least two crystal fusion peaks by DSC.

13 Claims, 9 Drawing Sheets

DSC chart of the EVOH resin composition in Example 1

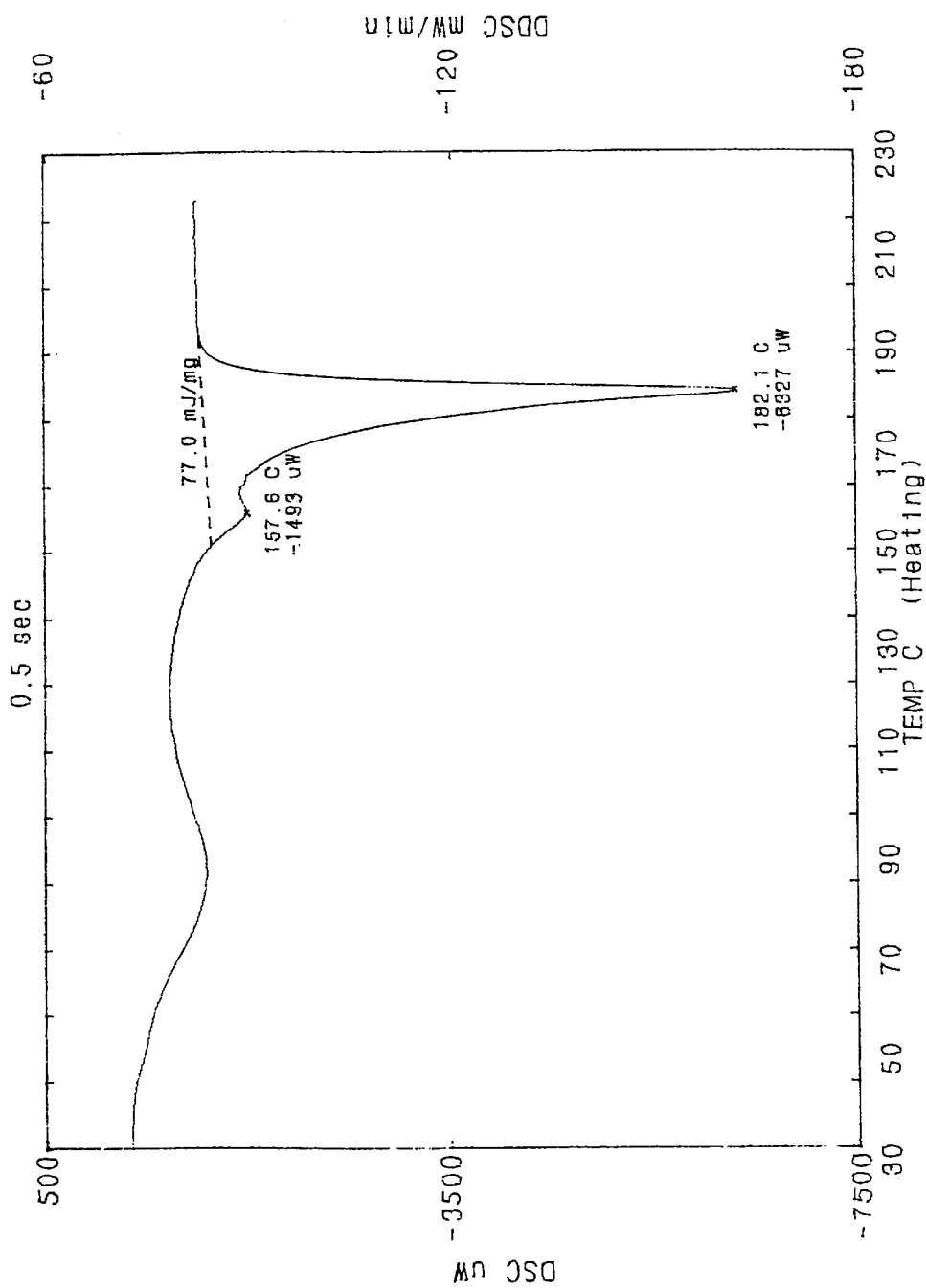
Fig. 1 DSC chart of the EVOH resin composition in Example 1

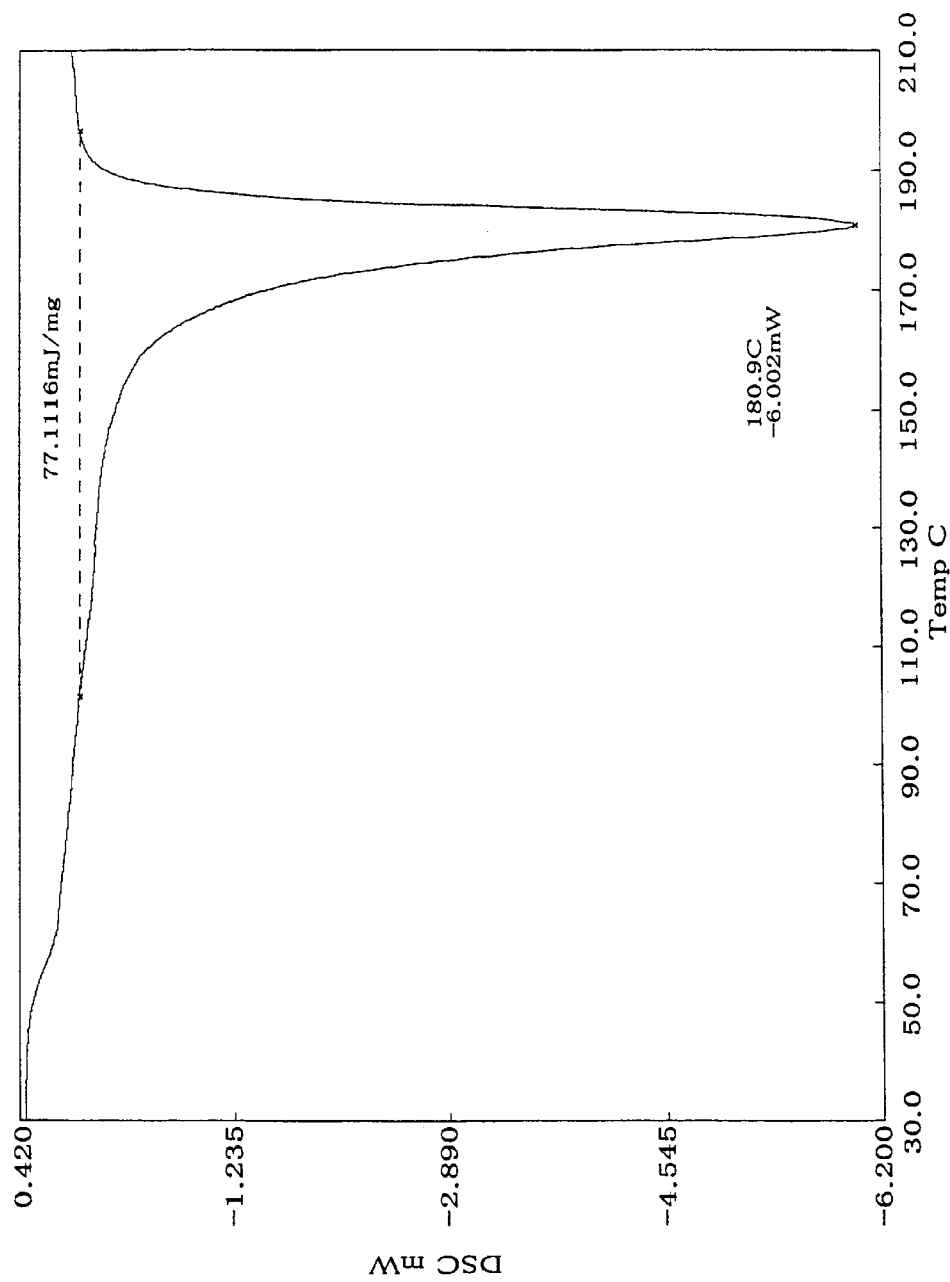
Fig. 2 DSC chart of the EVOH resin composition in Comparative Example 2

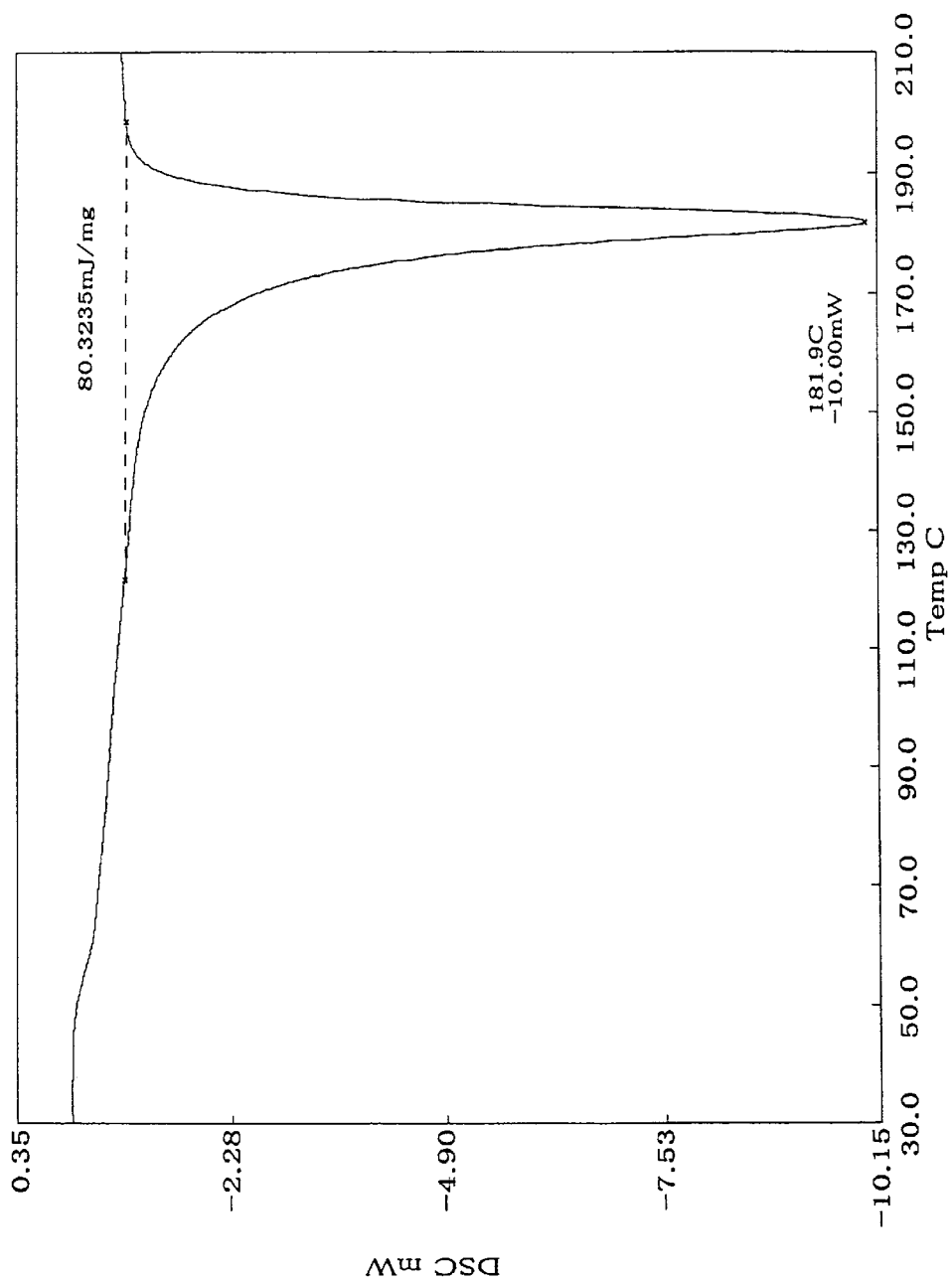
Fig. 3 DSC chart of the EVOH resin composition in Comparative Example 3

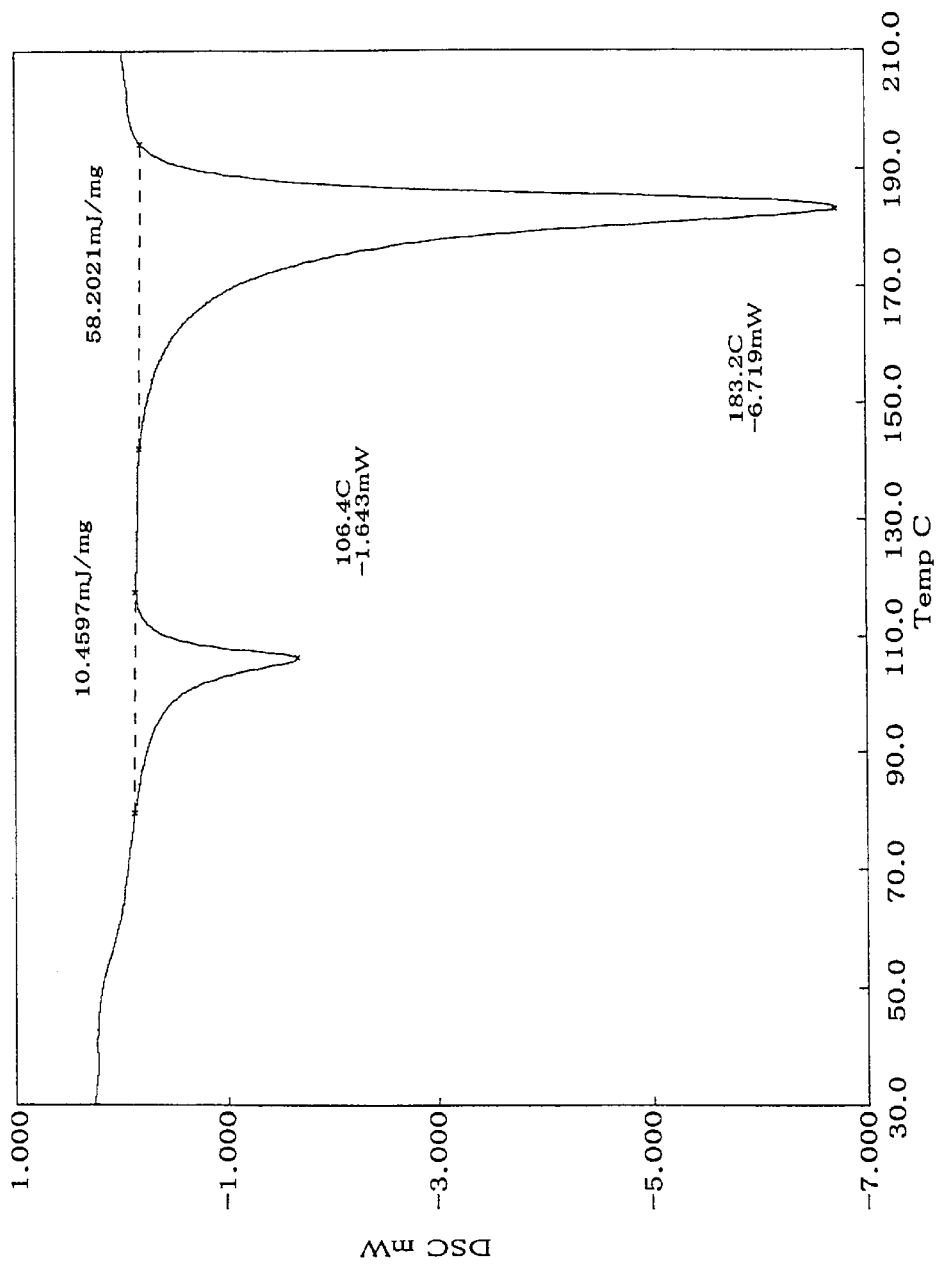
Fig. 4 DSC chart of the EVOH resin composition in Comparative Example 4

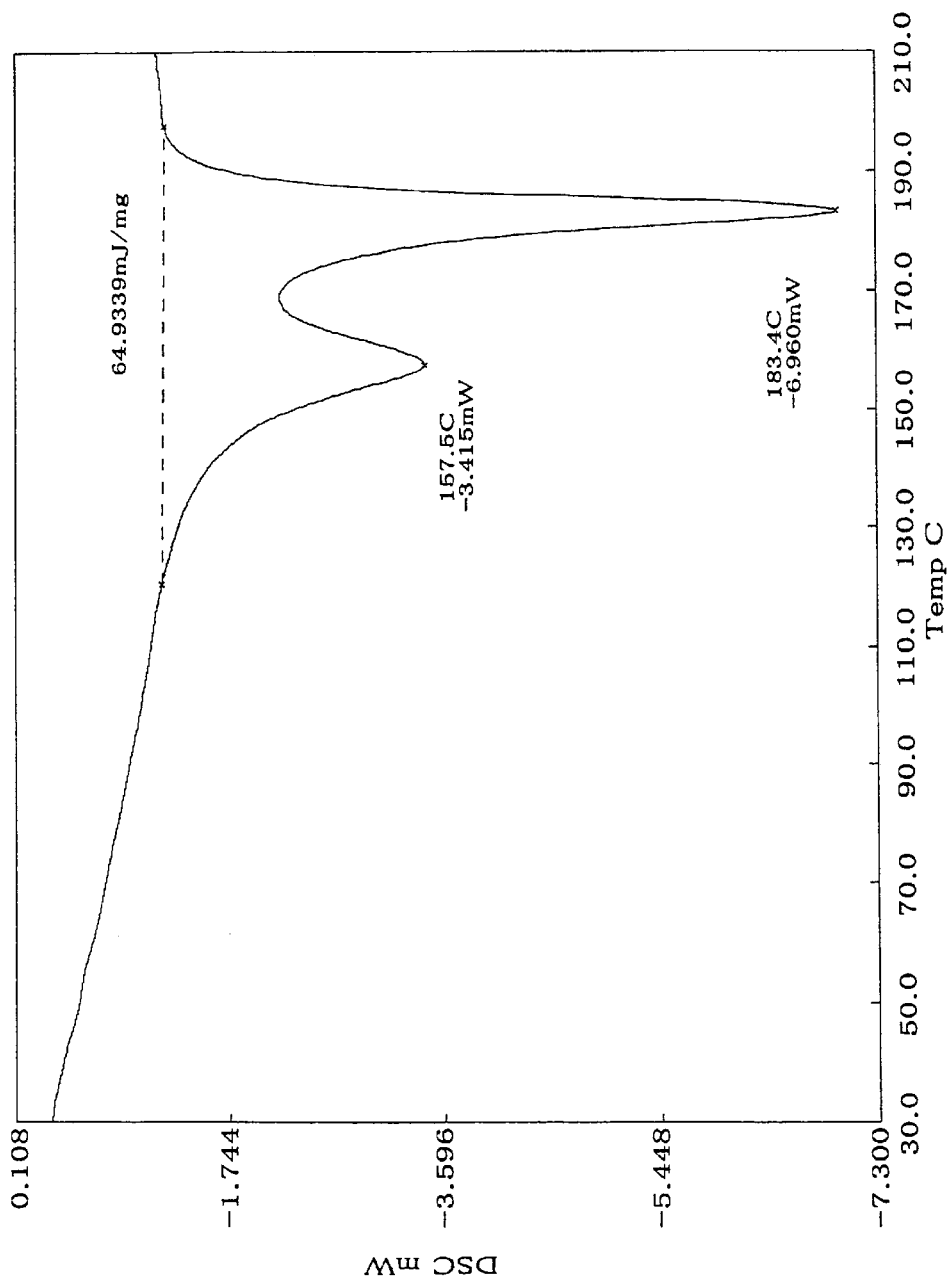
Fig. 5 DSC chart of the EVOH resin composition in Comparative Example 5

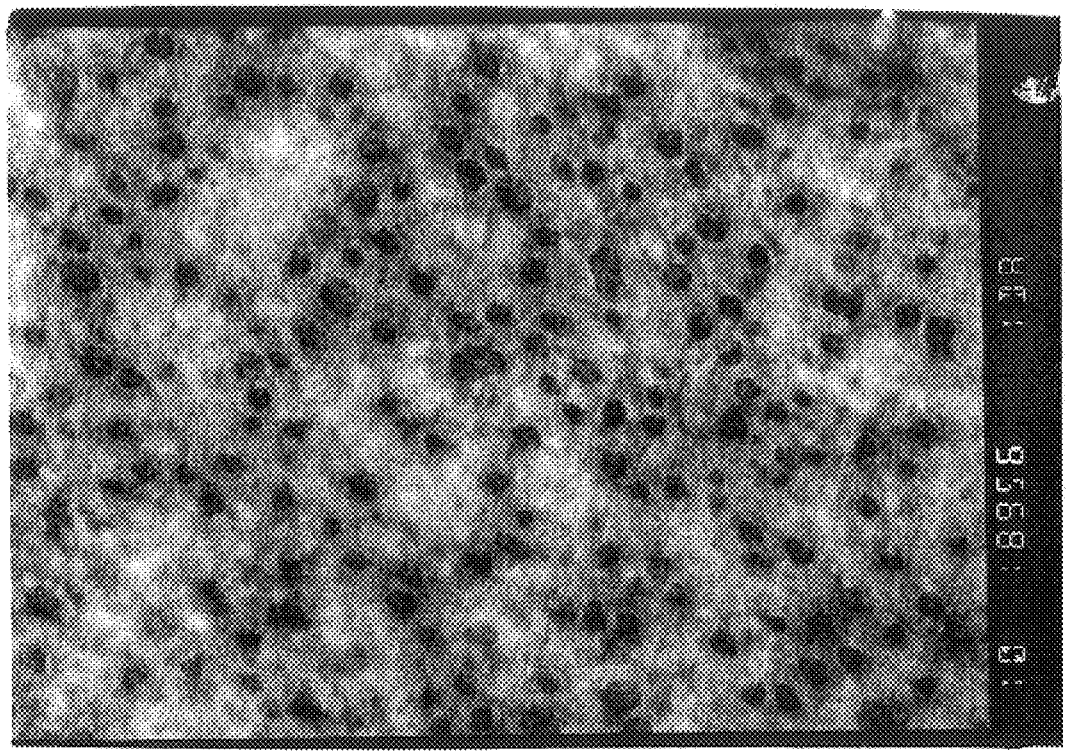
Fig. 6 TEM image showing the dispersion morphology of the EVOH resin composition pellets in Example 1
(Magnification; 20,000)

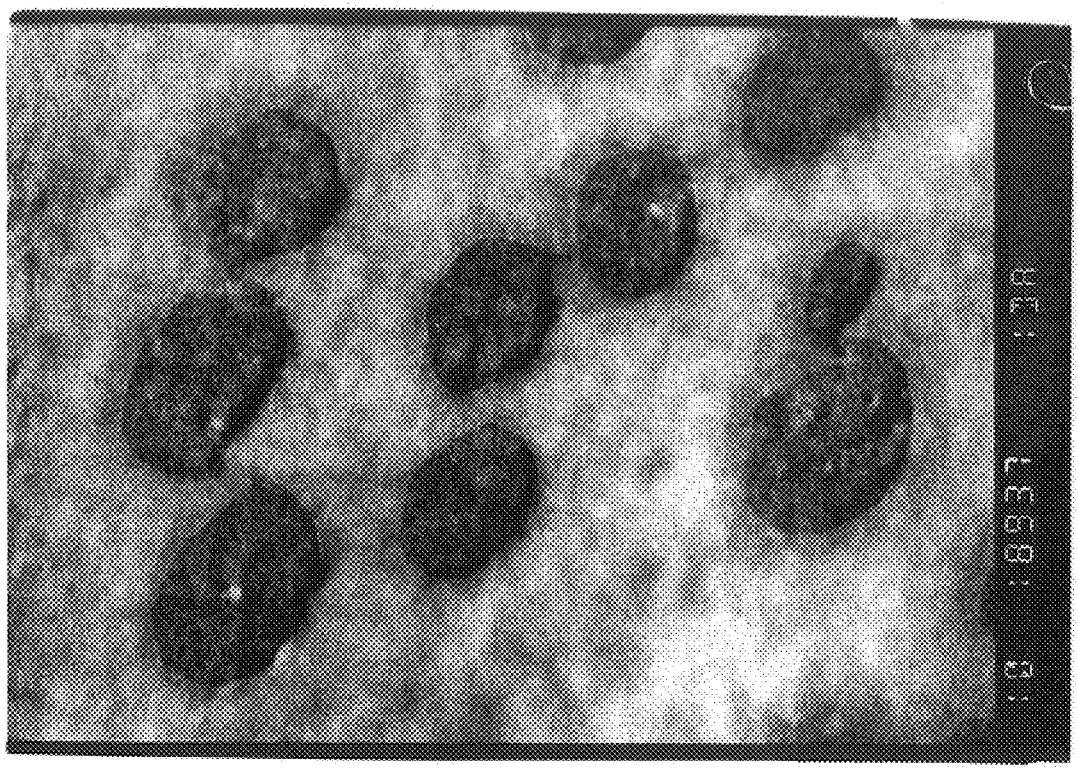
Fig. 7 TEM image showing the dispersion morphology of the EVOH resin composition pellets in Comparative Example 4 (Magnification; 20,000)

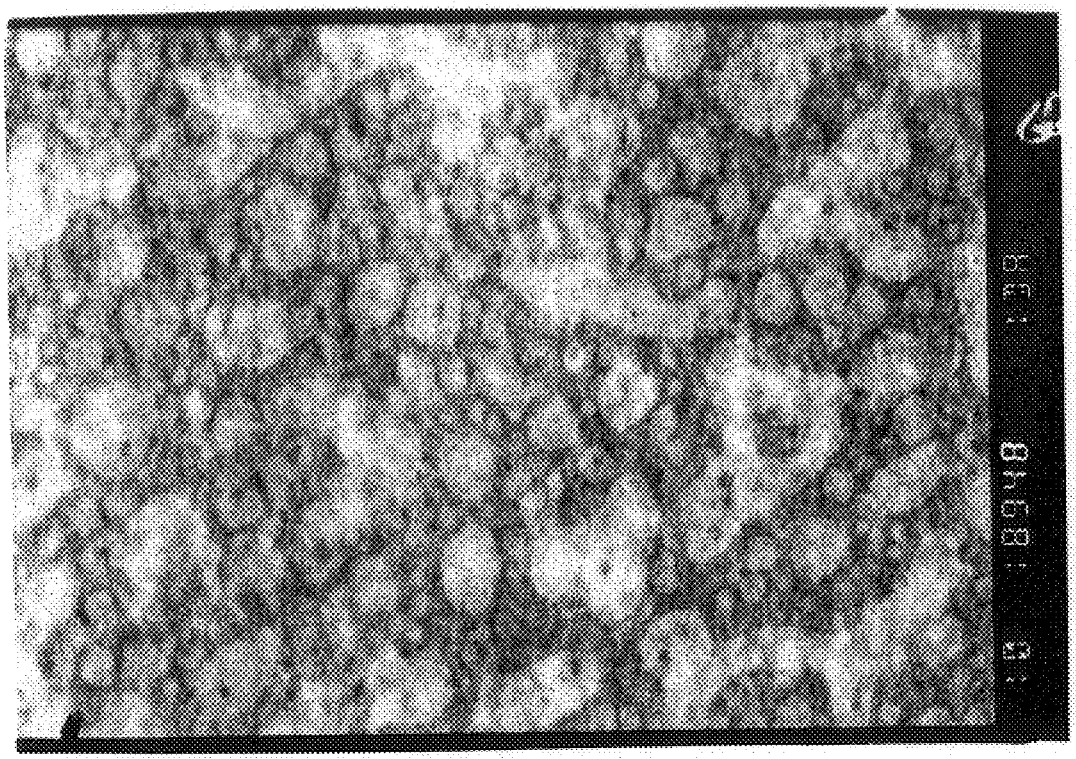
Fig. 8 TEM image showing the dispersion morphology of the EVOH resin composition pellets in Comparative Example 5
(Magnification; 20,000)

Fig. 9 TEM image showing the dispersion morphology of the EVOH resin composition layer in the blow-molded bottle in Example 1 (Magnification; 20,000)

COINJECTION STRETCH-BLOW MOLDED CONTAINER

BACKGROUND OF THE INVENTION

1. Field of the Invention

The present invention relates to coinjection stretch-blow molded containers with greatly improved impact delamination resistance, good gas barrier properties against oxygen, carbon dioxide, and other gasses, and good appearance, and which may be used as containers for beverages, foods, cosmetics, etc.

2. Description of the Related Art

Thermoplastic polyester (PES) containers produced by a stretch-blow molding process have various excellent properties including good transparency, good mechanical characteristics and good flavor barrier properties, and are sanitary and safe for daily use because they release few residual monomers and other harmful additives. Therefore, they have many applications in various fields. However, since their gas barrier properties are not always satisfactory, drinks, foods and other types of contents filled in such containers could be stored for only a relatively short period of time.

In order to overcome this drawback, various methods of combining a thermoplastic polyester with an ethylene-vinyl alcohol copolymer (EVOH), which has good gas barrier properties, to give laminated structures, have heretofore been proposed. Prior to stretch-blowing, a preform is first formed. Methods of forming the preform include, for example, coinjection molding, coextrusion molding, multi-stage injection molding, etc. Of these methods, coinjection molding may be carried out with a relatively simple apparatus which produces relatively little scrap. The moldings produced by a coinjection molding process may have a structure in which an EVOH layer is completely covered with another resin, for example a PES layer. Even though such moldings do not have an adhesive resin (Ad) layer between the EVOH layer and the PES layer, these multi-layered containers may have seemingly good appearance due to the adhesion affect of the ambient atmospheric pressure.

However, when such containers are filled with, for example, beverages, foods, etc., and experience a mechanical shock, for example by being dropped, the constituent PES layer(s) and EVOH layer(s) may readily delaminate, thereby seriously degrading the appearance of the container. This problem may be overcome by preparing coinjection molded containers having an Ad layer. Container structures such as PES/Ad/EVOH/Ad/PES (JP-A-56-501040) and PES/Ad/EVOH/Ad/PES/Ad/EVOH/Ad/PES (JP-A-50-135169, JP-A-61-152411, JP-A-61-152412, JP-A-61-259944) and the like have been investigated. However, the equipment for producing such structures is often extremely complicated, and controlling the thickness of each layer constituting the structure is often difficult. As a consequence, such containers are more expensive and more difficult to produce than multilayer containers having no Ad layer.

Other methods have also been investigated, in which EVOH is blended with other resins in order to increase the delamination resistance of containers which have no Ad layer. For example, JP-A-1-176554 discloses a method of blending EVOH with a polyamide-ester type thermoplastic resin. JP-A-1-182023 discloses a method of blending EVOH with a metal-containing polyester type thermoplastic resin. JP-A-3-175032 discloses a method of blending EVOH with a thermoplastic polyurethane. However, when EVOH is blended with such resins, containers with lower transparency are produced, which tend to have extremely poor appearance. In addition, the blending increases the production costs, and depending on the type of resins blended, the melt stability of the blends may be poor.

JP-A-3-175033 discloses a method of adding at least one salt selected from titanium salts, cobalt salts, manganese salts, antimony salts and germanium salts to EVOH in order to increase the delamination resistance of containers which have no Ad layer. However, the problem with this method is that the addition of such metal salts does not improve the delamination resistance of containers satisfactorily, and it also lowers the melt stability of EVOH.

JP-A-1-204736 discloses a method of blending a major EVOH component with a minor EVOH component in order to increase the delamination resistance of containers which have no Ad layer. The minor EVOH component has a larger ethylene content, a lower degree of saponification, a lower melting point and a larger melt index than the major EVOH component. However, containers produced by blending two different types of EVOH which have a 30 mol % or more difference in their ethylene content have low transparency and very bad appearance, as is shown in the examples of JP-A-1-204736. In addition, blending increases production costs, and the melt stability of the resulting blend may be poor.

SUMMARY OF THE INVENTION

The present invention provides multi-layered containers made by stretch-blow molding a preform which is prepared by coinjection-molding a polyester resin and an EVOH resin mixture. Even though containers formed by this method do not have an Ad layer, the containers have good impact delamination resistance and good gas-barrier properties. Other advantages of containers prepared by this method are that thay have high transparency, and stable resin melts.

The coinjection stretch-blow molded containers of the present invention comprise a thermoplastic polyester layer (layer A) and a resin composition layer (layer B) composed of a mixture of two EVOH copolymers (B1, B2), where layer A is in direct contact with both surfaces of layer B, and where the morphology of the resin composition is such that particles of EVOH B2 are dispersed in a matrix of EVOH B1, and the resin composition exhibits at least two crystal fusion peaks when analyzed by differential scanning calorimetry (DSC), and satisfies the following formulae (1) to (7):

$$60/40 \leq WB1/WB2 \leq 90/10 \qquad (1)$$

$$25 \leq ETB1 \leq 40 \qquad (2)$$

$$99 \leq SDB1 \qquad (3)$$

$$35 \leq ETB2 \leq 48 \qquad (4)$$

$$92 \leq SDB2 \leq 99 \qquad (5)$$

$$8 \leq ETB2 - ETB1 \leq 23 \qquad (6)$$

$$1 \leq SDB1 - SDB2 \leq 8 \qquad (7)$$

where:

WB1 and WB2 are the amounts by weight of EVOH B1 and EVOH B2, respectively, in the resin composition, ETB1 and ETB2 are the ethylene contents (mol %), respectively, in EVOH B1 and EVOH B2, and SDB1 and SDB2 are the degrees of saponification (%), respectively, of EVOH B1 and EVOH B2.

Preferably, pellets of the resin composition are injection-molded, and the particles of EVOH B2 dispersed in the matrix of EVOH B1 in the starting resin composition have a mean particle size of at most 0.8 µm.

Also preferably, the melt index of the two EVOHs (B1 and B2) satisfies the following formula (8):

$$0.1 \leq MIB1/MIB2 \leq 10 \tag{8}$$

where:

MIB1 and MIB2 are the melt indices of EVOH B1 and EVOH B2, respectively, measured in units of g/10 min, at 190° C. under a load of 2160 g.

Preferably, the intrinsic viscosity IVA (dl/g) of the thermoplastic polyester satisfies the following formula (9) and the melt index of the resin composition (i.e., the blend of B1 and B2) MIB (g/10 min, at 190° C. under a load of 2160 g) satisfies the following formula (10):

$$0.60 \leq IVA \leq 0.90 \tag{9}$$

$$0.1 \leq MIB \leq 10 \tag{10}.$$

Preferably, the haze of the body of the container is at most 5%.

The container of the present invention may be used to hold essentially anything that may be filled into the container, for example, food, beverages, cosmetics, pharmaceuticals, etc. Preferably, the contents of the container of the present invention is a carbonated beverage, and the container has a capacity of at most 800 ml.

The present invention also relates to a preform for the container, the process of making the container, and the resin composition formed by blending B1 and B2.

BRIEF DESCRIPTION OF THE DRAWINGS

FIG. 1 is a DSC chart of the EVOH resin composition of Example 1.

FIG. 2 is a DSC chart of the EVOH resin composition of Comparative Example 2.

FIG. 3 is a DSC chart of the EVOH resin composition of Comparative Example 3.

FIG. 4 is a DSC chart of the EVOH resin composition of Comparative Example 4.

FIG. 5 is a DSC chart of the EVOH resin composition of Comparative Example 5.

FIG. 6 is a TEM (transmission electronmicroscopic) image showing the dispersion morphology of the EVOH resin composition pellets of Example 1.

FIG. 7 is a TEM image showing the dispersion morphology of the EVOH resin composition pellets of Comparative Example 4.

FIG. 8 is a TEM image showing the dispersion morphology of the EVOH resin composition pellets of Comparative Example 5.

FIG. 9 is a TEM image showing the dispersion morphology of the EVOH resin composition layer in the blow-molded bottle of Example 1.

DETAILED DESCRIPTION OF THE INVENTION

The multi-layered container of the present invention comprises at least one thermoplastic polyester layer (layer A) and at least one EVOH layer (layer B).

The polyester resin which comprises layer A is a condensation polymer prepared from an aromatic dicarboxylic acid or its alkyl ester, and a diol. Preferably, the thermoplastic polyester has a repeat unit derived from ethylene terephthalate. It is desirable that at least 70 mol % of the total amount of monomers used in preparing the polyester be terephthalic acid and/or its derivatives and ethylene glycol and/or its derivatives, more preferably at least 90 mol %. If the total amount of terephthalic acid and ethylene glycol is less than 70 mol %, the copolyester will be amorphous. Stretched containers made of such an amorphous copolyester will shrink greatly if hot-filled, and will therefore have poor heat resistance and lower strength. Moreover, because such polymers are preferably polymerized in the solid state in order to reduce the amount of oligomers therein, such resins will be glutinous when softened, and will often be difficult to produce.

The PES of layer A of the present invention may optionally be copolymerized with any other bifunctional monomer besides terephthalic acid and ethylene glycol, as long as these additional bifunctional monomers do not significantly interfere with the workability, strength, heat resistance, and other desirable properties of the resin. The proportion (mol %) of these additional bifunctional monomers is preferably at most 30 mol % relative to the total moles of all of the monomers that constitute the PES, more preferably at most 20 mol %, even more preferably at most 10 mol %. Preferred bifunctional monomers include, for example, at least one bifunctional monomer selected from dicarboxylic acid monomers, diol monomers and hydroxycarboxylic acid monomers, and derivatives thereof. Any and every bifunctional monomer, except terephthalic acid (and derivatives thereof) and ethylene glycol (and derivatives thereof) may be used, including, for example, aliphatic bifunctional monomers, alicyclic bifunctional monomers, and aromatic bifunctional monomers.

Examples of aliphatic bifunctional monomers include divalent monomers derived from aliphatic dicarboxylic acids and their ester-forming derivatives, such as malonic acid, succinic acid, adipic acid, azelaic acid, sebacic acid, etc.; from aliphatic hydroxycarboxylic acids and their ester-forming derivatives, such as 10-hydroxyoctadecanoic acid, lactic acid, hydroxyacrylic acid, 2-hydroxy-2-methylpropionic acid, hydroxybutyric acid, etc.; and from aliphatic diols such as trimethylene glycol, tetramethylene glycol, hexamethylene glycol, neopentyl glycol, methylpentanediol, diethylene glycol, etc. Neopentyl glycol is the preferred aliphatic bifunctional monomer, since copolyesters containing neopentyl glycol are easy to produce, and have improved heat resistance.

Examples of the alicyclic bifunctional monomers include divalent monomers derived from alicyclic dicarboxylic acids and their ester-forming derivatives, such as cyclohexanedicarboxylic acid, norbornenedicarboxylic acid, tricyclodecanedicarboxylic acid, etc.; alicyclic hydroxycarboxylic acids and their ester-forming derivatives such as hydroxymethylcyclohexanecarboxylic acid, hydroxymethylnorbornenecarboxylic acid, hydroxymethyltricyclodecanecarboxylic acid, etc.; alicyclic diols such as cyclohexanedimethanol, norbornenedimethanol, tricyclodecanedimethanol, etc. Cyclohexanedimethanol or cyclohexanedicarboxylic acid are preferred alicyclic bifunctional monomers, since their copolyesters are easy to produce, and multi-layered containers containing such copolyesters have improved drop-impact strength and much enhanced transparency.

The cyclohexanedimethanol monomer is at least one divalent monomer selected from 1,2-cyclohexanedimethanol, 1,3-cyclohexanedimethanol and 1,4-cyclohexanedimethanol. The cyclohexanedicarboxylic acid monomer is at least one divalent monomer selected from 1,2-cyclohexanedicarboxylic acid, 1,3-cyclohexanedicarboxylic acid and 1,4-cyclohexanedicarboxylic acid.

The preferred alicyclic bifunctional compound monomers are 1,4-cyclohexanedimethanol and 1,4-cyclohexanedicarboxylic acid, since they are readily available and since copolyesters produced from these monomers have high drop-impact strength.

The aromatic bifunctional monomer may be any aromatic dicarboxylic acid, aromatic hydroxycarboxylic acid and aromatic diol. For example, the aromatic bifunctional monomers may include divalent monomers derived from aromatic dicarboxylic acids besides terephthalic acid and its ester-forming derivatives, such as isophthalic acid, phthalic acid, biphenyldicarboxylic acid, diphenyl ether-dicarboxylic acid, diphenyl sulfonedicarboxylic acid, diphenylketone-dicarboxylic acid, sodium sulfoisophthalate, 2,6-naphthalenedicarboxylic acid, 1,4-naphthalonedicarboxylic acid, 2,7-naphthalenedicarboxylic acid, etc.; aromatic hydroxycarboxylic acids and their ester-forming derivatives, such as hydroxybenzoic acid, hydroxytoluic acid, hydroxynaphthoic acid, 3-(hydroxyphenyl)propionic acid, hydroxyphenylacetic acid, 3-hydroxy-3-phenylpropionic acid, etc.; aromatic diols such as bisphenol compounds, hydroquinone compounds, etc.

The preferred aromatic dicarboxylic acid monomers include at least one of isophthalic acid monomers, phthalic acid monomers, naphthalenedicarboxylic acid monomers and 4,4'-biphenyldicarboxylic acid monomers, since copolyesters composed of such monomers are easy to produce and inexpensive.

In particular, isophthalic acid is preferred because copolyesters formed from it have good moldability over a broad range of molding conditions, and process for producing containers incorporating such monomers exhibit a low percentage of defective moldings. In addition, the isophthalic acid has the further advantage of retarding the crystallization rate of copolyesters, thereby preventing moldings of such copolyesters from whitening.

Naphthalenedicarboxylic acid is also preferred because it increases the glass transition temperature of copolyesters, thereby increasing the heat resistance of containers formed therefrom. In addition, polyester polymerized from naphthalenedicarboxylic acid absorb UV rays, and are therefore preferable for use in containers that should be resistant to UV rays. In order to protect the contents of coinjection stretch-blow molded containers from UV rays, the thermoplastic polyester used for producing the containers should have 0.1 to 15 mol % naphthalenedicarboxylic acid, more preferably from 1.0 to 10 mol %, relative to the sum total of all dicarboxylic acid monomers composing the polyester. The preferred naphthalenedicarboxylic acid is 2,6-naphthalenedicarboxylic acid, since copolyesters are readily and inexpensively produced from it.

Examples of aromatic bifunctional monomers include diols derived from 2,2-bis[4-(2-hydroxyethoxy)phenyl] propane, 2-(4-[2-(2-hydroxyethoxy)ethoxy]phenyl)-2-[4-(2-hydroxyethoxy)phenyl]propane, 2,2-bis(4-[2-(2-hydroxyethoxy)ethoxy]phenyl)propane, bis[4-(2-hydroxyethoxy)phenyl]sulfone, (4-[(2-hydroxyethoxy) ethoxy]phenyl)-[4-(2-hydroxyethoxy)phenyl]sulfone, 1,1-bis[4-(2-hydroxyethoxy)phenyl]cyclohexane, 1-(4-[2-(2-hydroxyethoxy)ethoxy)ethoxy]phenyl)-1-[4-(2-hydroxyethoxy)phenyl]cyclohexane, 1,1-bis[4-[2-(2-hydroxyethoxy)ethoxylphenyl]cyclohexane, 2,2-bis[4-(2-hydroxyethoxy)-2,3,5,6-tetrabromophenyl]propane, 1,4-bis (2-hydroxyethoxy)benzene, 1-(2-hydroxyethoxy)-4-[2-(2-hydroxyethoxy)ethoxy]benzene, 1,4-bis[2-(2-hydroxyethoxy)ethoxy]benzene, etc. The preferred diols are 2,2-bis[4-(2-hydroxyethoxy)phenyl]propane, bis[4-(2-hydroxyethoxy)phenyl]sulfone and 1,4-bis(2-hydroxyethoxy)benzene. Polyester resins containing any of these diols are easy to produce, have good melt stability, and provide moldings with good color tone and good impact resistance.

The PES of layer A may be composed of one or more of the bifunctional monomers mentioned above.

The PES of layer A may contain a small amount of diethylene glycol, which is a dimer of ethylene glycol monomer, and is formed as a minor by-product in the process of producing the polyester resin. However, if the polyester resin of the present invention contains a large amount of diethylene glycol monomer, its glass transition temperature will be lowered, resulting in lower heat resistance of the resin and undesirable resin color. As a consequence, the heat resistance, mechanical strength and the color tone of moldings, such as bottles, produced from the PES will be degraded. Therefore, it is desirable that the amount of diethylene glycol repeat units in the PES be minimized as much as possible. It is therefore desirable that the amount of diethylene glycol monomer in the PES be less than 3 mol %, more preferably at most 2 mol % relative to the total moles of all of the monomers comprising the polyester resin.

The PES of layer A of the present invention may optionally be copolymerized with any other polyfunctional monomers besides terephthalic acid and ethylene glycol. Preferred polyfunctional monomers are derived from at least one polyfunctional compound having at least three groups selected from carboxyl groups, hydroxyl groups and ester forming groups. It is desirable that the amount of repeat units derived from the polyfunctional compound in the PES be at most 0.5 mol % relative to the total moles of all of the monomers comprising the PES.

These polyfunctional monomers are not specifically defined, but may be derived from polyfunctional compounds having at least three groups, either the same or different, selected from carboxyl groups, hydroxyl groups and ester-forming groups. The polyfunctional compounds from which the polyfunctional monomers are derived may be any polyfunctional compound having at least three carboxyl groups only, those having at least three hydroxyl groups only, or those having at least three carboxyl and hydroxyl groups in total.

Preferred examples of the polyfunctional monomers include those derived from aromatic polycarboxylic acids such as trimesic acid, trimellitic acid, 1,2,3-benzenetricarboxylic acid, pyromellitic acid, 1,4,5,8-naphthalenetetracarboxylic acid, etc.; aliphatic polycarboxylic acids such as 1,3,5-cyclohexanetricarboxylic acid, etc.; aromatic polyalcohols such as 1,3,5-trihydroxybenzene, etc.; aliphatic or alicyclic polyalcohols such as trimethylolpropane, pentaerythritol, glycerin, 1,3,5-cyclohexanetriol, etc.; aromatic hydroxycarboxylic acids such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid, 2,4-dihydroxyphenylacetic acid, etc.; aliphatic hydroxycarboxylic acids such as tartaric acid, malic acid, etc.; and their ester-forming derivatives. The PES of layer A of the present invention may contain one or more polyfunctional monomers such as those mentioned above. Preferably, the PES contains at least one polyfunctional monomer derived from trimellitic acid, pyromellitic acid, trimesic acid, trimethylolpropane and pentaerythritol, because PES resins are readily and inexpensively prepared from such monomers.

In addition, the PES of layer A of the present invention may optionally contain, in addition to such polyfunctional monomers, monofunctional monomers derived from at least one monofunctional compound such as a monocarboxylic acids, monoalcohols, their ester-forming derivatives, etc.

It is desirable that a PES containing such monofunctional monomers have at most 5 mol % of the monofunctional monomer (or at most 5 mol % of the sum of all monofunctional monomers, when two or more different monofunctional monomers are used) relative to the total moles of all monomers used in preparing the resin. Gelling of polyesters which contain at most 5 mol % of the monofunctional monomer is retarded in many cases. More preferably, the amount of the monofunctional monomer is at most 1 mol %. If the amount of the monofunctional monomer is larger than 5 mol %, the polymerization rate of polyester resin in a melt polymerization or solid-phase polymerization process will be low, thereby making it more difficult to produce the polyester resin of the present invention.

The monofunctional monomers function as blocking monomers to block the terminal groups of the molecular chain or the terminal groups of the branched chains in the PES, thereby preventing it from being too crosslinked and/or gelled. The monofunctional monomers are not specifically defined, but are preferably those derived from at least one monocarboxylic acid, monoalcohol, or their ester-forming derivatives.

Preferred examples of the monofunctional monomers include monomers derived from monofunctional compounds, for example, aromatic monocarboxylic acids such as benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzolo acid, 1-naphthoic acid, 2-naphthoic acid, 2-biphenylcarboxylic acid, 1-naphthalenacetic acid, 2-naphthalenacetic acid, etc.; aliphatic monocarboxylic acids such as n-octanoic acid, n-nonanoic acid, myristic acid, pentadecanoic acid, stearic acid, oleic acid, linolic acid, linolenic acid, linoleic acid, etc.; ester-forming derivatives of these monocarboxylic acids; aromatic alcohols such as benzyl alcohol, 2,5-dimethylbenzyl alcohol, 2-phenethyl alcohol, phenol, 1-naphthol, 2-naphthol, etc.; aliphatic or alicyclic monoalcohols such as pentadecyl alcohol, stearyl alcohol, polyethylene glycol monoalkyl ethers, polypropylene glycol monoalkyl ethers, polytetramethylene glycol monoalkyl ethers, oleyl alcohol, cyclododecanol, etc. The polyester resin of the present invention may contain only one or at least two monofunctional monomers such as those mentioned above. The preferred monofunctional monomers are those derived from one or more monofunctional compounds selected from benzoic acid, 2,4,6-trimethoxybenzoic acid, 2-naphthoic acid, stearic acid and stearyl alcohol, because polyesters containing such monomers are readily and inexpensively produced.

In order that an easily moldable PES be obtained, it is desirable that the thermoplastic polyester used in the present invention consist essentially of an ethylene terephthalate monomer, and have a melting point, $T_M A(° C.)$, that satisfies the following formula (11)

$$240 \leq T_M A \leq 250 \tag{11}$$

If $T_M A$ is higher than 250° C., the crystallization rate of the PES may be too high, and the resin may crystallize too rapidly while it is injection molded or blow molded, thereby degrading the stretch orientation and shapability of the molded resin, resulting in whitened bottles. In addition, a PES having a $T_M A$ which is higher than 250° C. will have a narrower range of processing conditions in which good quality moldings may be obtained, and the percentage of failed moldings in the molding process may increase. Preferably, the $T_M A$ is not higher than 248° C.

On the other hand, if the melting point $T_M A$ is lower than 240° C., the heat resistance of the ultimate multi-layered container containing the PES will be low. In this case, the crystallinity of the PES is lowered too much, the stretch orientation is degraded, and the mechanical strength thereof is lower. Moreover, the reaction rate for preparing the resin will also be lower, because the solid-phase polymerization temperature for a resin having such a low melting point must inevitably be lower, thereby lowering the rate at which the resin can be prepared. More preferably, $T_M A$ is 242° C. or higher, most preferably 244° C. or higher.

In order to obtain a polyester resin having a $T_M A$ in the desired range, a PES consisting essentially of an ethylene terephthalate repeat unit may be copolymerized with a suitable amount of a comonomer. Specifically, it is desirable that the PES contain from 1 to 6 mol % of a comonomer, relative to the total moles of all of the monomers of the polyester. More preferably, the comonomer content of the polyester resin should fall between 1.5 and 5 mol %, most preferably between 2 and 4 mol %. Such comonomers are not specifically defined, and may be any of the monomers mentioned above. However, preferred comonomers include neopentyl glycol, cyclohexanedimethanol, cyclohexanedicarboxylic acid, isophthalic acid, and naphthalenedicarboxylic acid.

It is desirable that the PES of layer A have a glass transition temperature $T_G A$ of not lower than 60° C. In order to prevent shrinkage of the moldings, the $T_G A$ of the resin is preferably at least 70° C. If the polyester resin has a $T_G A$ less than 60° C., the resulting moldings, especially those molded by stretch-blow molding, will shrink after they are taken out of the mold and their appearance will be poor. The shrinkage of the moldings taken out of the mold is caused by the relaxation of residual molding stresses in the polymer.

The PES of layer A of the present invention may be produced by various methods, such as those mentioned below.

A preferred example of a PES is one consisting essentially of an ethylene terephthalate repeat unit that may be produced mainly from a dicarboxylic acid comprising terephthalic acid or an ester-forming derivative of terephthalic acid, and a diol comprising ethylene glycol, and optional bifunctional monomers, polyfunctional monomers and monofunctional monomers such as those mentioned above. It is desirable that the molar ratio of (all diol components)/(all dicarboxylic acid components) falls between 1.1/1 and 2.5/1.

To produce the PES of the present invention, the starting materials noted above are esterified or interesterified and thereafter polycondensed in the melt phase. If desired, the polyester produced by melt polycondensation may be further polymerized in the solid phase. The esterification or interesterification is preferably carried out at a pressure of at most about 5 kg/cm² (absolute pressure) or under normal pressure (i.e., about 1 atmosphere), at a temperature falling between 180 and 300° C., with the water or alcohol by-product of the condensation reaction evaporated away during the polymerization.

The esterification may be carried out in the absence of a catalyst. However, the interesterification is preferably carried out in the presence of an interesterification catalyst that may be at least one of calcium, manganese, magnesium, zinc, titanium, sodium and lithium compounds or the like. In particular, the preferred catalysts for producing a transparent resin are manganese, magnesium or titanium compounds.

After esterification or interesterified, optional additives may be added to the resulting prepolymer. Such additives may include a polycondensation catalyst, a coloration inhibitor, etc. The prepolymer is then polycondensed in the melt phase under a reduced pressure of at most 5 mmHg, at a temperature falling between 200 and 300° C., into a polyester having the desired viscosity. Any vertical batch-wise polycondensation device, continuous polycondensation devices comprising a horizontal, twin-screw rotary reactor, etc., may be used as the reactor for the melt polycondensation.

It is desirable that the PES obtained by melt polycondensation have an intrinsic viscosity of from 0.40 to 0.90 dl/g, more preferably from 0.45 to 0.80 dl/g, in order to obtain a more easily handled polyester. If the PES obtained by melt polycondensation has an intrinsic viscosity of lower than 0.40 dl/g, its melt viscosity is too low when the PES is taken out of the reactor. As a result, it is often difficult to extrude the PES in the form of strands or sheets, and in addition, it is often also difficult to pelletize the PES into uniform pellets. Moreover, it will take a long time to increase the molecular weight of the PES, which reduces the rate of production of the intended PES. On the other hand, if the intrinsic viscosity of the PES is higher than 0.90 dl/g, the melt viscosity is too high. As a result, it is often difficult to take out the PES out of the reactor. In addition, the PES will tend to be thermally degraded and have an undesirable color.

Any conventional polycondensation catalyst may be used in the melt polycondensation process. For example, such catalysts may include antimony compounds such as antimony trioxide, etc.; germanium compounds such as germanium dioxide, germanium tetraethoxide, germanium tetra-n-butoxide, etc.; titanium compounds such as tetramethoxytitanium, tetraethoxytitanium, tetra-n-propoxytitanium, tetraisopropoxytitanium, tetrabutoxytitanium, etc.: tin compounds such as di-n-butyltindilaurate, di-n-butyltin oxide, dibutyltin diacetate, etc. These catalyst compounds may be used either singly, or as a mixture of one or more catalyst. Preferred catalysts include germanium compounds, which provide a polyester with a good color tone. Less expensive preferred catalysts include antimony compounds. An especially preferred germanium compound is germanium dioxide, and an especially preferred antimony compound is antimony trioxide. When a polycondensation catalyst is used, the preferred amount is from 0.002 to 0.8% by weight relative to the weight of the dicarboxylic acid component.

Germanium compounds are preferred to antimony compounds because the resulting PES resins formed have better moldability. This is because the PES made with the antimony compound catalyst will crystallize more rapidly (i.e., have a higher crystallization rate) when heated for injection molding than a polyester made with a germanium compound catalyst. As a result, the stretch orientation of moldings made from PES produced with an antimony catalyst is poorer, and the shapability of the molding is worse than for a molding made from a PES produced using a germanium compound. Specifically, bottles molded from PES resins produced with an antimony catalyst will be tend to whiten. In addition, such antimony compound catalyzed polyesters exhibit a narrower range of conditions in which good moldings may be obtained, and the molding process in which they are used also tend to experience a higher percentage of failed moldings than when germanium compound catalyzed polyesters are used.

Therefore, it is important to select the right catalyst when preparing polyethylene terephthalate which does not contain any comonomer component except the by-product of diethylene glycol. This is because the crystallization rate of such a polyethylene terephthalate polyester is higher than that of other polyethylene terephthalates modified with a small amount of another comonomer. Germanium compounds are preferably used as the catalyst.

Color inhibitors which may be used in the polycondensation may include a phosphorus compound, for example, phosphorous acid, phosphoric acid, trimethyl phosphite, triphenyl phosphite, tridecyl phosphite, trimethyl phosphate, tridecyl phosphate, triphenyl phosphate, etc. The phosphorus compounds may be used either singly or in combination. When used, any of the above phosphorus compound color inhibitors may be present in an amount of preferably from 0.001 to 0.5% by weight relative to the weight of the dicarboxylic acid component.

In order to prevent the polyester from being pyrolyzed and yellowed during processing, a cobalt compound, such as cobalt acetate or the like, may be added in an amount of from 0.001 to 0.5% by weight, preferably from 0.05 to 0.3% by weight, relative to the weight of the dicarboxylic acid component.

Diethylene glycol is formed as a by-product in the process of producing the polyester. However, if the polyester contains a large amount of diethylene glycol units, its glass transition temperature will decrease, thereby lowering its heat resistance, and causing the polyester to become colored. As a result, the heat resistance, mechanical strength and color tone of the moldings produced from the polyester will be poorer. In order to prevent these problems, it is desirable to carry out the esterification, the interesterification and/or the melt polycondensation in the presence of a diethylene glycol production retardant, in an amount of from 0.001 to 0.5% by weight relative to the weight of the dicarboxylic acid component. Such diethylene glycol production retardants may be selected from tetraalkylammonium hydroxides such as tetraethylammonium hydroxide, etc.; organic amines such as triethanolanine, triethylamine, etc. Using the diethylene glycol production retardant may lower the proportion of diethylene glycol repeat units which may be incorporated into the polyester resin.

The PES obtained by melt polycondensation may be extruded in the form of strands, sheets or the like, then cooled, and pelletized with a strand cutter, a sheet cutter or the like, into pellets of various shapes, for example, columnar, oval columnar, spherical, disk-like or dice-like pellets, etc. Any cooling method may be employed to cool the PES removed from the reactor. For example, such methods may include a water cooling in a water tank, a cooling with a drum, air cooling, etc.

It is desirable that the PES thus obtained be dried and crystallized heating it at a temperature falling between 120° C. and 180° C., and then molding it or subjecting it to the next solid-phase polymerization step. Preferably, the quantity of heat required for crystal fusion of the crystallized PES is at least 10 J/g, more preferably at least 20 J/g. If the quantity of heat for crystal fusion of the crystallized PES is smaller than 10 J/g, the pellets of the resin will be glutinous and gel during the solid-phase polymerization or while they are dried prior to being molded.

If desired, the polyester produced in the manner described above may be subjected to solid-phase polymerization so as to increase its degree of polymerization prior to being used. The solid-phase polymerization reduces the amount of oligomer and acetaldehyde remaining in the resin, thereby reducing the extent to which the resin contaminates the mold. In addition, such solid-phase polymerized resin does not degrade the flavor, odor, and other properties of the contents of the containers made therefrom. The solid-phase polymerization of the polyester is preferably carried out under vacuum, or under reduced pressure, or in an inert gas such as nitrogen gas or the like. In order to prevent the polyester pellets from gelling together during solid-phase polymerization, it is also desirable to move the pellets continuously during the solid-phase polymerization process, for example, by rolling, using a gaseous fluidized bed or the like. The solid-phase polymerization is preferably carried out at a temperature falling between 180 and 270° C., more preferably between 190 and 240° C. It is desirable that the temperature of the solid-phase polymerization fall within this defined range, and that the temperature be higher by at least 15° C., more preferably at least 20° C., than the melting point of the final polyester (i.e., the polyester used in the invention). It is also desirable that the solid-phase polymerization time falls generally between around 5 and 40 hours or so.

The resin composition of layer B of the present invention is a mixture of two EVOH copolymers B1 and B2. The particles of EVOH B2 are dispersed in a matrix of EVOH B1. This resin composition exhibits at least two crystal fusion peaks in the differential scanning calorimetry analysis (DSC), and satisfies the following formulae (1) to (7):

$$60/40 \leq WB1/WB2 \leq 90/10 \quad (1)$$

$$25 \leq ETB1 \leq 40 \quad (2)$$

$$99 \leq SDB1 \quad (3)$$

$$35 \leq ETB2 \leq 48 \quad (4)$$

$$92 \leq SDB2 \leq 99 \quad (5)$$

$$8 \leq ETB2-ETB1 \leq 23 \quad (6)$$

$$1 \leq SDB1-SDB2 \leq 8 \quad (7)$$

where:

WB1 and WB2 are, respectively, the amount by weight of EVOH B1 and EVOH B2 in the resin composition, ETB1 and ETB2 are, respectively, the ethylene content (mol %) in EVOH B1 and EVOH B2, SDB1 and SDB2 are, respectively, the degree of saponification (%) of EVOH B1 and EVOH B2.

It is important that the resin composition of layer B have a morphology such that particles of EVOH B2 are dispersed in a matrix of EVOH B1. Specifically, it is important that particles of EVOH B2, which have a higher ethylene content and a lower degree of saponification, are dispersed in EVOH B1, which has a lower ethylene content and a higher degree of saponification.

EVOH B1, which has a good gas-barrier property, forms the matrix component of the resin composition forming layer B. Particles of EVOH B2, which do not have good gas-barrier properties, are dispersed in the matrix of EVOH B1. EVOH B1 provides good gas-barrier properties, while, surprisingly, EVOH B2 improves the impact delamination resistance of layer B, even though it is dispersed in a matrix of EVOH B1.

If the difference in ethylene content between EVOH B1 and EVOH B2 is too small, phase separation does not occur when the two resins are blended, and EVOH B2 may not disperse in EVOH B1 in the form of particles, which is contrary to the intent of the invention. When this occurs, the gas-barrier properties of layer B are reduced, and the thermal stability of the resin composition melt is poor.

As will be described in detail below, the resin composition of EVOH B1 and EVOH B2 has the intended dispersion morphology when the chemical composition of EVOH B1 and EVOH B2, as well as the blend ratio and the MI ratio of the two resins are specifically defined.

Preferably, the particles of EVOH B2 dispersed in the matrix of EVOH B1 in the resin composition have a mean particle size of at most 0.8 μm.

If the mean particle size of the particles of EVOH B2 dispersed in EVOH B1 is larger than 0.8 μm, the gas-barrier properties or the impact delamination resistance of layer B will be poor. The mean particle size of the particles of EVOH B2 is more preferably at most 0.5 μm, even more preferably at most 0.3 μm.

The intended mean particle size of the particles EVOH B2 can be obtained by specifically controlling the blend ratio of EVOH B1 and EVOH B2 and the MI ratio of the two resins.

The dispersion morphology of the resin composition of EVOH B1 and EVOH B2 can be analyzed by observing the melt of a sheet of the resin composition with a thermal optical microscope, for example, in the manner provided below. Using this method, it is possible to analyze the interface between EVOH B1 and EVOH B2, even if these resins differ only slightly in their composition. For some samples of the resin composition, it is also possible to analyze the interface between the two resins by transmission electronic microscopy (TEM).

It is important that the resin composition of layer B exhibit at least two crystal fusion peaks by DSC. This indicates that EVOH B1 and EVOH B2 are phase separated and therefore separately exhibit their respective crystal fusion peaks by DSC. This further indicates that the two resins have somewhat different melting points. The presence of at least two DSC crystal fusion peaks ensures that the material has improved impact delamination resistance, while maintaining the gas barrier properties and the thermal stability of the resin composition.

The blend ratio, by weight, of EVOH B1 to EVOH B2 (i.e., WB1/WB2) should have a value that falls between 60/40 and 90/10. Within this defined range, EVOH B1 and EVOH B2 can provide the intended dispersion morphology, as well as improved impact delamination resistance, without interfering with the gas-barrier properties and the thermal stability of the composition.

If WB1/WB2 is smaller than 60/40, layer B may not have good gas-barrier properties. On the other hand, if WB1/WB2 is larger than 90/10, the impact delamination resistance of layer B is poor. Preferably, WB1/WB2 is at least 70/30, but at most 85/15.

The ethylene content ETB1 of EVOH B1 should fall between 25 and 40 mol %. If ETB1 is smaller than 25 mol %, the resin composition may not have good gas-barrier properties at high humidity, and its melt moldability may be poor. Preferably, ETB1 is at least 28 mol %, more preferably at least 30 mol %. If ETB1 is larger than 40 mol %, the resin composition may not have good gas-barrier properties. Preferably, ETB1 is at most 38 mol %, more preferably at most 35 mol %, even more preferably at most 33 mol %.

The degree of saponification, SDB1, of the vinyl ester moiety of EVOH B1 is at least 99% preferably at least 99.3%, more preferably at least 99.5%. If SDB1 is smaller than 99 mol %, the resin composition may not have good gas-barrier properties, especially at high humidity.

The ethylene content ETB2 of EVOH B2 falls between 35 and 48 mol %. If ETB2 is smaller than 35 mol %, the resin composition may not have good impact delamination resistance. Preferably, ETB2 is at least 37 mol %, more preferably at least 40 mol %. If ETB2 is larger than 48 mol %, the resin composition may not have good gas-barrier properties. Preferably, ETB2 is at most 45 mol %.

The degree of saponification, SDB2, of the vinyl ester moiety of EVOH B2 is at least 92%, preferably at least 94%, more preferably at least 96%. If SDB2 is smaller than 92 mol %, the resin composition may not have good gas-barrier properties at high humidity, and in addition, the thermal stability may be low and the moldings produced therefrom may have defects called "fish eyes." SDB2 is at most 99%, preferably at most 98%, more preferably at most 97.5%. If SDB2 is larger than 99%, the impact delamination resistance of the resin composition may not be acceptable.

ETB1 of EVOH B1 and ETB2 of EVOH B2 should satisfy the following formula (6):

$$8 \leq ETB2-ETB1 \leq 23 \tag{6}$$

Accordingly, ETB2 should be larger than ETB1, and that the difference in the ethylene content between the two resins should fall between 8 and 23 mol %.

If ETB2–ETB1 is larger than 23 mol %, the transparency of a container produced therefrom is poor. On the other hand, if ETB2–ETB1 is smaller than 4 mol %, the impact delamination resistance of layer B is poor. Preferably, the uppermost limit of the ethylene content difference is at most 20 mol %, more preferably at most 18 mol %, even more preferably at most 16 mol %. Also preferably, the lowermost limit of the ethylene content difference is at least 10 mol %.

SDB1 of EVOH B1 and SDB2 of EVOH B2 should satisfy the following formula (7):

$$1 \leq SDB1-SDB2 \leq 8 \tag{7}$$

Accordingly, the SDB1 should be larger than SDB2, and that the difference in the degree of saponification between the two resins falls between 1 and 8%. If SDB1–SDB2 is smaller than 1%, the impact delamination resistance of layer B is poor. On the other hand, if SDB1–SDB2 is larger than 8%, the resin composition may not have good gas-barrier properties at high humidity. In addition, the thermal stability of the resin composition may be poor, and the moldings produced therefrom will have fish eyes. Preferably, the uppermost limit of SDB1–SDB2 is at most 5%, more preferably at most 4%. Also preferably, the lowermost limit of SDB1–SDB2 is at least 1.5%, more preferably at least 2%.

The resin composition of layer B should have a mean ethylene content (i.e., the weighted average of the ethylene contents of EVOH B1 and EVOH B2) falling between 28 and 44 mol %. If its mean ethylene content is smaller than 28 mol %, the resin composition will tend to have poor gas-barrier properties at high humidity, and in addition will tend to have poor melt moldability. More preferably, the mean ethylene content of the resin composition should be at least 30 mol %, even more preferably at least 32 mol %. If, however, its mean ethylene content is larger than 44 mol %, the resin composition may not have sufficiently good gas-barrier properties. More preferably, the mean ethylene content of the resin composition should be at most 42 mol %, even more preferably at most 40 mol %.

The resin composition should also have a mean degree of saponification (i.e., the weighted average of the degree of saponification of EVOH B1 and EVOH B2) of at least 94%, more preferably at least 96%, even more preferably at least 97%, still more preferably at least 98%. If its mean degree of saponification is smaller than 94%, the resin composition may have poor gas-barrier properties at high humidity. In addition, the thermal stability of the resin composition will be poor, and the moldings will have fish eyes. The ethylene content and the degree of saponification of the EVOHs may be determined by nuclear magnetic resonance spectroscopy (NMR). If the EVOH resin composition of layer B is a mixture of three or more EVOHs, any two of the EVOHs therein should satisfy the above-mentioned formulae (1) to (7).

The melt indices (MIB1, MIB2, measured at 190° C. under a load of 2160 g according to JIS K7210) of EVOH B1 and EVOH B2 preferably fall between 0.1 and 15 g/10 min. When MIB1 and MIB2 fall within the defined range, the resulting resin composition will tend to have good melt moldability and good high-speed, long-run workability, does not tend to give fish eyes, and the resulting multi-layered containers have a good appearance. When the resin composition is combined with the thermoplastic polyester and formed into multi-layered containers, the impact delamination resistance between the thermoplastic polyester layer (layer A) and the EVOH mixture layer (layer B) is good. More preferably, the lowermost limit of MIB1 and MIB2 is at least 0.5 g/10 min, and the uppermost limit is at most 10 g/10 min, even more preferably at most 8 g/10 min. For the same reasons, the melt index MIB of the resin mixture of EVOH B1 and EVOH B2, preferably falls between 0.1 and 10 g/10 min. More preferably, the lowermost limit of MIB is at least 0.5 g/10 min. and the uppermost limit is at most 8 g/10 min, even more preferably at most 6 g/10 min.

Also, the ratio of MIB1 to MIB2 preferably satisfies the following formula (8), in order to ensure finer dispersion of B2 in B1:

$$0.1 \leq MIB1/MIB2 \leq 10 \tag{8}$$

More preferably, the ratio MIB1/MIB2 is at least 0.3, even more preferably at least 0.5. Also, the ratio of MIB1/MIB2 is preferably at most 7, even more preferably at most 5.

EVOH resins used in the present invention may be obtained by saponifying ethylene-vinyl ester copolymers in the presence of alkali catalysts, etc. One typical example of a vinyl ester is vinyl acetate, but any other vinyl esters of fatty acids (e.g., vinyl propionate, vinyl pivalate) may also be employed.

The EVOH resins of the present invention may be copolymerized with a small amount of any other comonomers as long as the presence of such comonomers does not interfere with the object of the present invention. Examples of the comonomers which may be used includes α-olefins such as propylene, 1-butene, isobutene, 4-methyl-1-pentene, 1-hexene, 1-octene, etc.; unsaturated carboxylic acids such as itaconic acid, methacrylic acid, acrylic acid, maleic anhydride, etc.; their salts, partial or complete esters, nitrites, amides and anhydrides; vinylsilane compounds such as vinyltrimethoxysilane, etc.; unsaturated sulfonic acids and their salts; alkylthiols; vinylpyrrolidones, etc.

In particular, EVOH copolymerized with from 0.0002 to 0.2 mol % of a vinylsilane compound is preferred, because it is more compatible with the substrate resin with which it is in contact. In addition, such resins have improved melt viscosity, thereby enabling one to obtain homogeneous coinjection moldings. The vinylsilane compound includes, for example, vinyltrimethoxysilane, vinyltriethoxysilane, vinyltri(β-methoxy-ethoxy)silane, γ-methacryloxypropylmethoxysilane, etc. Vinyltrimethoxysilane and vinyltriethoxysilane are preferred. In order to obtain homogeneous coinjection moldings, the amount of the comonomer, vinylsilane compound copolymerized with EVOH is preferably between 0.001 and 0.15 mol %, more preferably between 0.005 and 0.1 mol %.

EVOH containing a boron compound also has good melt viscosity, and has the advantage of giving homogeneous coinjection moldings. The boron compound may include, for example, boric acids, borates, salts of boric acids, boron hydrides, etc. Specifically, the boric acids include orthoboric acid (this will be referred to as boric acid), metaboric acid. tetraboric acid, etc.; the borates include triethyl borate, trimethyl borate, etc.; the salts of boric acids include alkali metal salts and alkaline earth metal salts of various boric acids such as those mentioned above, as well as borax, etc. Orthoboric acid is preferred.

The amount of boron compound in the EVOH of the present invention may fall between 20 and 2,000 ppm, but preferably between 50 and 1,000 ppm, more preferably between 100 and 500 ppm, based on boron. When the amount of boron compound is within the defined range, torque variation is reduced in the EVOH melt. However, if the boron compound content is smaller than 20 ppm, the boron compound will have little effect on the properties of the EVOH. However, if the boron compound content is larger than 2,000 ppm, the EVOH will readily gel and cannot be molded well.

The EVOH of the present invention may also contain an alkali metal salt in an amount of from 5 to 5,000 ppm based on the alkali metal. The alkali metal salt may be added to improve the interlayer adhesion and compatibility of EVOH. More preferably, the amount of the alkali metal salt added may fall between 20 and 1,000 ppm, even more preferably between 30 and 500 ppm, based on the alkali metal element. The alkali metal includes, for example, lithium, sodium, potassium, etc., and the alkali metal salt may be any monovalent metal salt of aliphatic carboxylic acids, aromatic carboxylic acids, phosphoric acids, metal complexes, etc. For example, such salts include sodium acetate, potassium acetate, sodium phosphate, lithium phosphate, sodium stearate, potassium stearate, sodium ethylenediaminetetraacetate, etc. The preferred salts include sodium acetate, potassium acetate and sodium phosphate.

Preferably, the EVOH resins used in the present invention may contain 2 to 200 ppm of a phosphorus compound, more preferably from 3 to 150 ppm, even more preferably 5 to 100 ppm, based on phosphorus. If the phosphorus content of EVOH is smaller than 2 ppm, or larger than 200 ppm, the melt moldability and the thermal stability of EVOH may be poor. In particular, if such EVOH resins are exposed to the molding conditions for a long time, the resulting moldings have poor appearance due to the formation of gelled fish eyes and discoloration.

The type of the phosphorus compound added to EVOH is not specifically defined. For example, various acids such as phosphoric acid, phosphorous acid, etc., and their salts, may be used. If phosphates are used, they may be incorporated into EVOH in any form, for example primary phosphates, secondary phosphates and tertiary phosphates. The cations used in the salts are also not specifically defined. However, the salts are preferably alkali metal salts and alkaline earth metal salts. Sodium dihydrogenphosphate, potassium dihydrogenphosphate, disodium hydrogenphosphate, or dipotassium hydrogenphosphate are especially preferred salts.

In addition, any thermal stabilizer, UV absorbent, antioxidant, colorant, filler or other resin (polyamides, polyolefins, etc.) may be blended with the EVOH resin of the present invention, as long as such additives to not affect the other properties of the ultimate molding produced (i.e., delamination resistance, gas barrier, appearance, etc.).

One method for producing the multi-layered container of the invention is described below.

A multi-layered container precursor (preform) is generally formed in a molding machine equipped with two injection cylinders. In this type of molding machine, the single mold is clamped shut, and then molten PES resin and molten EVOH resin compositions are coinjected into the mold from the separate injection cylinders, using alternate and/or concentric nozzles. Coinjection in this manner provides the intended multi-layered preform.

Specific examples of preparing a preform follow:
(1) PES for the inner and outer layers is first injected, and then an EVOH resin composition for the Interlayer is injected to give a three-layered container preform of PES/EVOH/PES; or
(2) PES for the inner and outer layers is first injected, then an EVOH resin composition is injected while, either during or after the EVOH injection, PES for the core layer is again injected to give a five-layered container preform of PES/EVOH/PES/EVOH/PES.

Any conventional method of producing ordinary bottomed preforms, in which the interlayer is completely sealed with the inner and outer PES layers, may be used. Accordingly, the method of preparing a preform of the present invention need not require any special equipment.

It is desirable that the PES be injected at a temperature falling between 250° C. and 330° C., more preferably between 270° C. and 320° C., even more preferably between 280° C. and 310° C. If the injection temperature for PES is lower than 250° C., the PES pellets may not be well melted and the resulting moldings may therefore have poor appearance due to fish eyes caused by unmelted PES pellets. In addition, the moldings containing unmelted PES pellets will have lower mechanical strength. In some extreme cases, the screw torque required for injecting the PES may increase enough to cause problems in operating the molding machine. However, PES injection temperatures higher than 330° C. may degrade the PES, lowering the molecular weight, and thereby lowering the mechanical strength of the resulting moldings. In addition, PES degradation at such high temperatures may generate contaminants such as acetaldehyde and the like, which may migrate into and degrade the properties of the contents of the container made with this PES. Moreover, the oligomers produced by PES degradation will greatly contaminate the mold, thereby degrading the appearance of moldings produced therein.

It is desirable that the EVOH resin composition be injected at a temperature falling between 170° C. and 250° C., more preferably between 180° C. and 240° C., even more preferably between 190° C. and 230° C. If the EVOH resin composition injection temperature is lower than 170° C., pellets of the EVOH resin composition may not be melted properly, and the resulting moldings may have fish eyes and poor appearance due to unmelted EVOH pellets. In some extreme cases, the screw torque required for injecting the EVOH may increase enough to cause problems in operating the molding machine. However, if the EVOH injection temperature is higher than 250° C., the EVOH resin composition may degrade or gel, thereby resulting in poor appearance and yellowing of the resulting moldings. In addition, the flow of the injected EVOH melt may be disrupted by EVOH gels and vapors formed by EVOH degradation. The resulting EVOH resin composition layer will then have discontinuities, thereby lowering the gas-barrier properties of the layer. In some extreme cases, the presence of EVOH gels may make it impossible to continue the injection molding operation.

It is desirable that the temperature of the heated channels through which the PES and the EVOH resin composition flow when injected into the mold falls between 220° C. and 300° C., more preferably between 240° C. and 280° C., even more preferably between 250° C. and 270° C. If the temperature of the heated channels is lower than 220° C., PES will crystallize and solidify in the channel, making the molding operation more difficult. However, if the temperature of the heated channels is higher than 300° C., the EVOH may degrade and gel, thereby resulting a moldings which are yellowed and have poor appearance. In addition, the flow of the injected EVOH melt may be disrupted by EVOH gels and vapors formed by EVOH degradation. The resulting EVOH resin composition layer will then have discontinuities, thereby lowering the gas-barrier properties of the layer. In some extreme cases, the presence of EVOH gels may make it impossible to continue the injection molding operation.

In order to ensure that multi-layered containers obtained by stretch-blowing bottomed preforms have good delamination resistance, it is important that the crystallization of PES and EVOH is minimized as much as possible when injection molding the preforms. When the crystallization of PES and EVOH is minimized, the preforms may be uniformly stretched into good containers having good delamination resistance, high transparency and good shape retention. In order to retard the crystallization of PES and EVOH in the preforms, it is desirable that the mold temperature fall between 0° C. and 70° C., more preferably between 5° C. and 50° C., even more preferably between 10° C. and 30° C. If the mold temperature is lower than 0° C., the dew which condenses on the mold will degrade the appearance of the preforms, and good moldings may not be obtained. On the other hand, mold temperatures higher than 70° C., will promote the crystallization of PES and EVOH in the preforms. As a result, the preforms may not stretch uniformly, and the delamination resistance of the resulting moldings obtained by stretch-blow molding will be low. In addition, it may be difficult to obtain moldings of the intended shape. Moreover, PES crystallization will lower the transparency of the moldings.

The total thickness of the preform is preferably between 2 and 5 mm, and the thickness of the EVOH resin composition layers is preferably between 10 and 500 $\mu$m, in total.

While hot, or after having been re-heated at 75 to 150° C. (i.e., using a block heater, an IR heater or the like), the multi-layered preform is transferred directly to the stretch-blowing step. In the stretch-blowing step, the preform is stretched one- to five-fold in the machine direction, and thereafter blown one- to four-fold with compressed air into a multi-layered, stretch-blown polyester container, with the PES resin layer and the EVOH resin composition layer being monoaxially or biaxially oriented.

If the multi-layered preform is heated to too high a temperature, the PES will readily crystallize, and the resulting stretch-blown container may whiten and have a poor appearance. In addition, the stretch-blown container will also exhibit increased delamination. On the other hand, if the multi-layered preform is heated to too low a temperature, the PES may craze and have a pearly appearance, thereby reducing the transparency of the resulting stretch-blown container. For these reasons, the multi-layered preform should be heated preferably between 85° C. and 140° C., more preferably between 90° C. and 130° C., even more preferably between 95° C. and 120° C.

The total thickness of the body of the multilayered container of the present invention generally falls between 100 $\mu$m and 3 mm, and may vary depending on the particular intended use of the container. The total thickness of the EVOH resin composition layers in the body of the multi-layered container is preferably between 2 and 200 $\mu$m, more preferably between 5 and 100 $\mu$m.

The intrinsic viscosity IVA of the PES of layer A should fall between 0.60 and 0.90 dl/g, in order that the resulting molding have the desired mechanical strength and appearance, and to improve the ease with which moldings may be produced. If IVA is smaller than 0.60 dl/g, the mechanical strength of the resulting moldings may be low. In addition, the polyester resin may also crystallize while heating the preform molding or while blow molding. Consequently, the stretch orientation of the moldings may be degraded or the preform may not be properly stretched, resulting in moldings with low transparency. More preferably, IVA is at least 0.65 dl/g, even more preferably at least 0.70 dl/g. However, if IVA is higher than 0.90 dl/g, the melt viscosity of the PES will be too high and it may not be possible to inject mold the resin into preforms. In addition, when the preforms are stretch-blown, the resin may stretch unevenly and provide moldings with significantly poorer appearance. In any case, when IVA falls outside the range defined above, various molding failures occur. More preferably, IVA is at most 0.85 dl/g. However, it is known that IVA may be reduced during the melt molding process. Accordingly, it may be desirable to use polyester pellets for layer A which have an intrinsic viscosity slightly higher than the range defined above.

The terminal carboxyl concentration $C_A$ of the polyester resin is preferably at most 40 microequivalents/g in order to provide a polyester resin with good melt stability and good yellowing resistance, and to provide extruded moldings with a smooth surface. More preferably, $C_A$ is at most 30 microequivalents/g. Polyester resins with a terminal carboxyl concentration $C_A$ larger than 40 microequivalents/g tend to have poor thermal stability when melted, may degrade to a much lower molecular weight polymer, and provide yellowed moldings. However, because the $C_A$ of the polyester resin may increase somewhat due to the melt molding process, it may be desirable to use a polyester which has a $C_A$ value somewhat lower than the range described above.

It is desirable that the oligomer (i.e., ethylene terephthalate cyclic trimer) content $CT_A$ of the polyester resin of the present invention be at most 2% by weight. Polyester resins having such a low oligomer content do not tend to contaminate the mold with oligomer, thereby providing moldings with improved appearance. In addition, the use of such polyester resins reduces the need to clean the mold and other parts of the molding machine, and increase the production rate of the molding process. In order to prevent the mold from being soiled by oligomers, $CT_A$ is more preferably at most 1.5% by weight, even more preferably at most 1.0 g by weight. Because the oligomer content of the polyester may increase somewhat during the molding process, it may be desirable to use a polyester resin containing a lower level of oligomer than the range described above.

It is desirable that the PES of layer A in the body of the multi-layered container of the invention have a density $D_A$ (g/cm$^3$) falling between 1.35 and 1.37. If $D_A$ of the thermoplastic polyester layer is smaller than 1.35 g/cm$^3$, the layer will not stretch sufficiently and have low mechanical strength. In addition, the polyester layer of the container will also shrink when the container is heated during, for example, a hot filling or sterilization process. More preferably, $D_A$ is at least 1.353 g/cm$^3$, even more preferably at least 1.355 g/cm$^3$. However, if $D_A$ is higher than 1.37 g/cm$^3$, the multi-layered container may more readily delaminate. Preferably, $D_A$ is at most 1.367 g/cm$^3$, even more preferably at most 1.365 g/cm$^3$.

It is desirable that the EVOH resin composition of layer B of the multi-layered container of the present invention have a density $D_B$ falling between 1.11 g/cm$^3$ and 1.20 g/cm$^3$. If $D_B$ is smaller than 1.11 g/cm$^3$, layer B may not have good gas-barrier properties. Preferably, $D_B$ is at least 1.12 g/cm$^3$, more preferably at least 1.13 g/cm$^3$. However, if $D_B$ is larger than 1.20 g/cm$^3$, the multi-layered container may more readily delaminate. Preferably, $D_B$ is at most 1.19 g/cm$^3$, more preferably at most 1.18 g/cm$^3$.

It is desirable that the internal haze of the body of the multi-layered container of the present invention, measured according to the method described below, is at most 5%. If the internal haze is larger than 5%, the multi-layered container will have a poor appearance. More preferably, the internal haze is at most 4%, even more preferably at most 3%.

The multi-layered containers comprising the PES resin and the specific EVOH resin composition described above, and produced as described above, especially by coinjection stretch-blow molding, resist delamination when mechanically shocked even though they do not have an adhesive resin layer. In addition, such containers have good transparency and good gas-barrier properties.

The containers of the present invention are suitable for preserving their contents, in good condition, for a long period of time. Such containers are especially useful for holding various beverages such as carbonated beverages, beer, wine, etc., and also for holding various foods, cosmetics, etc. In particular, molded containers for carbonated beverages require high carbon dioxide gas-barrier properties. However, ordinary multi-layered PET bottles which do not have an adhesive resin layer often delaminate because of the the pressure difference between the inside and outside of the bottles. In contrast, the multi-layered containers of the present invention have extremely good gas-barrier properties and do not readily delaminate between the PES layer (layer A) and the EVOH layer (layer B). Such containers are therefore well suited to hold carbonated beverages. The containers of the present invention may hold any type of carbonated beverage. Preferably, the containers of the present invention are suitable for carbonated beverages which have a lower limit of carbon dioxide gas pressure of at least 1 kg/m$^2$, more preferably at least 1.5 kg/m$^2$, even more preferably at least 2 kg/m$^2$. Carbonated beverages having such a high carbon dioxide gas pressure may be safely packaged and stored in the containers of the present invention for the storage period required by the market, without significant leakage of carbon dioxide gas from the container. This property of the containers of the present invention is quite significant. In order to ensure that the flavor of the carbonated beverage remains good, and to ensure that the packed containers remain safe and stable during storage and transportation, the carbonated beverages should have an upper limit of carbon dioxide gas pressure of preferably at most 5 kg/m$^2$, more preferably at most 4.5 kg/m$^2$, even more preferably at most 4 kg/m$^2$.

In addition, the multi-layered containers of the present invention preferably have a capacity of at most 800 ml. PET bottles for beverages are in great demand at present. In addition to large PET bottles which have a capacity of 1 liter or more, small PET bottles having a capacity of 500 ml or less also be popular because they are easy to handle, distribute and sell, as well as being fashionable. Most conventional PET bottles have a large capacity of 1 liter or more, or even 1.5 liters or more. Even though their gas-barrier properties are not very good, such large bottles may be acceptable for carbonated beverage storage, because their surface area is small relative to their volume. This is effective for preventing carbon dioxide gas leakage for a desired period of time from large bottles containing carbonated beverages.

However, small bottles have higher surface area relative to their volume. Therefore in order to safely store beverages in them, small bottles must have better gas-barrier properties than large bottles. This requirement is more significant for alcoholic drinks such as beer and the like, which are more readily oxidizable, and also for carbonated beverages which should maintain their intended carbon dioxide gas content for a predetermined period of time. Since the multi-layered containers of the present invention have excellent gas-barrier properties, they are suitable for such small-sized drink or beverage applications. More preferably, the multi-layered containers of the invention have a capacity of at most 600 ml, even more preferably at most 400 ml. The present invention is of great significance because containers of the present invention can safely and reliably maintain the quality of their contents even though small containers have a small volume relative to their surface area.

The invention is described in more detail with reference to the following Examples, which, however, are not intended to restrict the scope of the invention. In the following Examples, the samples were analyzed and evaluated according to the methods mentioned below.

(1) Constituent Unit Contents of Polyester:

Polyester samples are analyzed by $^1$H-NMR (nuclear magnetic resonance) using a JOEL JNM-GX-500, with trifluoroacetic acid deuteride as the solvent. The composition of the polyester was determined from the $^1$H-NMR spectrum.

(2) Intrinsic Viscosity (IVA) of Polyester:

Samples were cut from the polyester layer of the body of a multi-layered container, and the viscosity was measured in a 1/1 (by weight) mixture of phenol and tetrachloroethane, at 30° C., using an Ubbelohde viscometer (HRK-3 Model from Hayashi Seisakusho).

(3) Glass Transition Temperature ($T_GA$) and Melting Point ($T_MA$) of Polyester:

Samples were cut from the polyester layer of the body of a multi-layered container, and the glass transition temperature ($T_GA$) and melting point ($T_MA$) were measured by differential scanning colorimetry (DSC) according to JIS K7121, using a model RDC220/SSC5200H DSC (from Seiko Electronics Industry). The test conditions are as follow. Each sample was held at 280° C. for 5 minutes, then cooled to 30° C. at a cooling rate of 100° C./min, held at that temperature for 5 minutes, and then heated at a heating rate of 10° C./min. The $T_GA$ and $T_MA$ were determined from the DSC chart. Indium and lead were used for the temperature calibration. The glass transition temperature, as defined herein, is the midpoint of the glass transition (Tmg) according to JIS K7121. The melting point, as defined herein, is the temperature of the peak point in the melting curve (Tpm), also according to JIS K7121.

(4) Terminal Carboxyl Concentration ($C_A$) of Polyester:

0.2 g of a polyester sample removed from the polyester layer of the body of a multi-layered container was dissolved in 10 ml of benzyl alcohol heated at 215° C., to which was added 10 ml of chloroform. The resulting sample solution was titrated with a solution of sodium hydroxide in benzyl alcohol.

(5) Oligomer (cyclic trimer) Content ($CT_A$) of Polyester:

100 mg of a polyester sample removed from the body of a multi-layered container was dissolved in 2 ml of chloroform/1,1,1,3,3,3-hexafluoro-2-propanol (1/1, by volume), and diluted with 8 ml of additional chloroform. Enough acetonitrile was added to make a 100 ml solution, re-precipitating the polymer component. The polymer was then removed by filtration, and the filtrate was subjected to high-performance liquid chromatography (column: Chemco's ODS-II) using aqueous solution of 75 vol % acetonitrile as an eluent. The sample was quantitatively analyzed by the UV absorbance, visible absorbance and refractive index in order to obtain the ethylene terephthalate cyclic trimer content (wt. %) of the sample.

(6) Ethylene Content and Degree of Saponification of EVOH:

The ethylene content and the degree of saponification of EVOH were obtained from the $^1$H-NMR (nuclear magnetic resonance) spectrum of EVOH dissolved in dimethyl sulfoxide deuteride, using a JOEL JNM-GX-500.

(7) Melting Points of EVOH Resins (TMB1, TMB2):

The melting point of each starting EVOH was measured by differential scanning colorimetry (DSC) according to JIS K7121, using a RDC220/SSC5200H model DSC (from Seiko Electronics Industry). The sample was held at 240° C. for 5 minutes, then cooled to 30° C. at a cooling rate of 100° C./min, held at this temperature for 5 minutes, and then heated at a heating rate of 10° C./min. The melting point of the sample was obtained from the DSC chart. Indium and lead were used for the temperature calibration. The melting point was defined as the peak point in the melting curve (Tpm) according to JIS K7121.

(8) DSC Analysis of EVOH Resin Composition:

Samples were removed from the EVOH resin composition layer of the body of a multi-layered container, and the melting point was measured by DSC according to JIS K7121, using a model RDC220/SSC5200H DSC (from Seiko Electronics Industry). The sample was held at 240° C. for 5 minutes, then cooled to 30° C. at a cooling rate of 100° C./min, held at this temperature for 5 minutes, and then heated at a heating rate of 10° C./min. The melting point of the sample was obtained from the DSC chart. Indium and lead were used for the temperature calibration. The melting point was defined as the peak point in the melting curve (Tpm) according to JIS K7121. Those samples having at least two maximum or minimum values in the DSC crystal fusion profile are within the scope of the present invention.

(9) Melt Index (MIB, MIB1, MIB2) of EVOH and EVOH Resin Composition:

The melt index was measured using a melt indexer, model L244 (from Takara Industry). EVOH pellets were added to a cylinder having an inner diameter of 9.55 mm and a length of 162 mm, and melted therein at 190° C. To the resulting EVOH melt, a uniformly applied plunger load of 2,160 g and a diameter of 9.48 mm was applied, thereby causing the EVOH to be extruded out of the cylinder through an orifice having a diameter of 2.1 mm, whereupon the flow rate (units of g/10 min) of the EVOH melt being extruded was measured.

(10) Phosphate Radical Content of EVOH:

The phosphate radical content of the EVOH was measured based on the phosphate ion ($PO_3^{4-}$) content according to the following method. 10 g of a dry sample of EVOH was added to 50 ml of 0.01 N HCl, and stirred at 95° C. for 6 hours. The resulting solution was quantitatively analyzed by ion chromatography to measure the phosphate ion content of the sample. The sample was eluted through a CIS-A23 (from Yokogawa Electric) column using an aqueous eluent containing 2.5 mM sodium carbonate and 1.0 mM sodium hydrogencarbonate. The sample was quantified based on a calibration curve, constructed from aqueous solutions of phosphoric acid.

(11) Na, K, Mg Ion Content of EVOH:

10 g of dry chips of EVOH were added to 50 ml of 0.01 N HCl, and stirred at 95° C. for 6 hours. The resulting solution was quantitatively analyzed by ion chromatography. The Na ion content, K ion content and Mg ion content were measured using an ICS-C25 (from Yokogawa Electric) column, eluted with an aqueous solution containing 5.0 mM tartaric acid and 1.0 mM 2.6-pyridinedicarboxylic acid. The quantification was based on a calibration curves constructed from the analysis of aqueous solutions of sodium chloride, aqueous solutions of potassium chloride, and aqueous solutions of magnesium chloride. The alkali metal and alkaline earth metal salt content of the sample was calculated based on the metal.

(12) Dispersion Morphology of the Resin Composition:

Sheets having a thickness of about 10 μm are prepared from EVOH composition pellets by the use of a microtome. A sheet was sandwiched between a slide glass and a cover glass, mounted on an optical microscope equipped with a hot stage, heated at 200° C. for 3 minutes, and then observed through the microscope. This method may be used to determine whether or not EVOH B1 and EVOH B2 are phase separated.

(13) Mean Particle Size of EVOH B2:

Sheets having a thickness of at most 100 nm are obtained from a sample of EVOH composition pellets using a Leica Reichert ULTRACUT-S equipped with a diamond knife. The sheet may optionally be stained, and were then imaged using a Hitachi H-800NA TEM analyzer. The mean area per particle in the sample was obtained from the image, and the mean particle size was defined as the diameter of a circle having the same area as the mean area per particle of the EVOH B2 dispersed in the sample.

In order to identify EVOH B1 and EVOH B2 in the sample, the sample need not be stained if the density difference between the two EVOH resins is large, because the two resins may then be easily identified by the shading of the TEM image of the sample. Typically, EVOH resin B1 exhibits a darker shade in the TEM image because its density is higher than EVOH B2.

However, if the density difference between the two EVOH resins is small, the sample may be stained to help differentiate the resins B1 and B2 from each other. The method of staining the sample may vary depending on the type of sample. For example, the sample may be stained with osmium tetroxide. In the Examples described below, the samples were exposed to osmium tetroxide vapor for seven days at room temperature. Because EVOH B2 has a higher ethylene content and a lower degree of saponification, it absorbs a larger amount of osmium tetroxide, and therefore exhibits a darker shade in the TEM image.

(14) Frequency of Delamination of Multi-Layered Container:

100 molded bottles were each filled with water and sealed with a stopper under normal pressure. Holding the body of the bottle in a horizontal orientation, each bottle was dropped from a height of 50 cm onto a triangular stand having a length of 20 cm and having an angle of 90° at its tip that faces the dropped bottle. The drop test is performed only once on each bottle, and the 90° tip of the stand is targeted to the center of the body of the dropped bottle. The frequency of delamination is calculated from the number of bottles which delaminated in the test, according to the following formula:

Frequency of Delamination (%) =[(number of delaminated bottles)/100]×100.

(15) Haze Value of Multi-Layered Container:

The body of a bottle sample was divided into four equal portions around the circumference at its center, and the internal haze of each of those four portions was measured with a Poic integrating-sphere light transmittance/complete light reflectance meter (HR-100 Model from Murakami Color Technology Laboratories) according to ASTM D1003-61. The data were averaged, and the resulting mean value indicates the haze value of the bottle.

(16) Oxygen Transmission Rate Through Multi-Layered Container:

Bottle samples to be analyzed are conditioned at 20° C. and 65% RH on the outside and at 20° C. and 100% RH on the inside, and the oxygen transmission rate through each bottle, in units of ml/bottle-day-atm, is measured with an oxygen transmission rate measuring device, OX-TRAN-10/50A (from Modem Control). During the measurement, all bottles were kept conditioned at 20° C. and 65% RH on the outside and at 20° C. and 100% RH on the inside.

(17) Carbon Dioxide Transmission Rate Through Multi-Layered Container:

Bottle samples were conditioned at 20° C. and 65% RH on the outside and at 20° C. and 100% RH on the inside, and then filled with carbonated water to 4.0 gas volume (3.6 kg/cm$^2$) at 20° C. The carbon dioxide transmission rate through each bottle, in units of ml/bottle-day-atm, was measured with a carbon dioxide transmission rate measuring device, PERMATRAN-C-IV Model (from Modern Control).

(18) Thermal Stability of EVOH Composition;

The polyester resin and the EVOH composition to be tested were molded into a two-resin, three-layered preform, having the structure PES/EVOH/PES, by coinjection molding, using an ASB-50HT coinjection stretch-blow molding machine from Nissei ASB. The temperature of the PES injection zone was 290° C., the temperature of the EVOH injection zone was 230° C., and the temperature of the heated flow channel block in which the two resins, PES and EVOH were combined was 265° C. The two resins, PES and EVOH, were held at the conditioning temperature in the heated flow channel block for 30 minutes. Then, the combined resins were coinjected into a mold cavity. The temperature of the injection mold core was 15° C., and the temperature of the injection mold cavity was 15° C. The appearance of the preform prepared in this manner was then observed.

EXAMPLE 1

The polyester resin used herein was prepared according to the method mentioned below.

(1) 100.000 parts by weight of terephthalic acid and 44.830 parts by weight of ethylene glycol were made into a slurry, to which were added 0.010 parts by weight of germanium dioxide, 0.010 parts by weight of phosphorous acid and 0.010 parts by weight of tetraethylammonium hydroxide. The resulting slurry was heated under pressure (absolute pressure of 2.5 kg/cm$^2$) at 250° C. and esterified to a degree of up to 95%, thereby providing an oligomer. The resulting oligomer was subjected to melt polycondensation under a reduced pressure of 1 mmHg at a temperature of 270° C. to obtain a polyester prepolymer having an intrinsic viscosity of 0.50 dl/g. The resulting polyester prepolymer was extruded through a nozzle into a strand, cooled with water, and pelletized into columnar pellets (diameter: about 2.5 mm, length: about 2.5 mm). The resulting pellets were pre-dried at 160° C. for 5 hours and crystallized. A crystallized polyester prepolymer was obtained.

(2) The amounts of the constituent monomers of the polyester prepolymer prepared in (1) were measured by NMR. The terephthalic acid monomer content, the ethylene glycol monomer content and the diethylene glycol (by-product) monomer content of the polyester prepolymer were 50.0 mol %, 48.9 mol % and 1.1 mol %, respectively. The terminal carboxyl content and the melting point of the polyester prepolymer were measured according to the methods described above, and were 38 microequivalents/g and 253° C., respectively.

Next, the polyester prepolymer was pre-dried at 160° C. for 5 hours and crystallized.

(3) The crystallized polyester prepolymer was subjected to solid-phase polymerization for 10 hours in a rolling-type, vacuum, solid-phase polymerization device, under a reduced pressure of 0.1 mmHg at 220° C., thereby producing a polyester resin having an increased molecular weight.

(4) The amounts of the constituent monomers of the polyester resin prepared in (3) were measured by NMR. The terephthalic acid monomer content, the ethylene glycol monomer content and the diethylene glycol monomer content of the polyester resin were 50.0 mol %, 48.9 mol % and 1.1 mol %, respectively.

The intrinsic viscosity, the melting point, the glass transition temperature $T_GA$, the terminal carboxyl content and the cyclic trimer content of the polyester resin were 0.83 dl/g, 252° C., 80° C., 22 microequivalents/g and 0.32% by weight, respectively.

An EVOH resin having an ethylene content (ETB1) of 32 mol %, a degree of saponification (SDB1) of 99.7%, a melt index (MIB1, at 190° C. under a load of 2,160 g) of 4.0 g/10 min, and a melting point of 183° C. was selected as EVOH B1. The phosphate radical content, the Na ion content, the K ion content and the Mg ion content of this EVOH were measured, and were 95 ppm, 15 ppm, 7 ppm and 4 ppm, respectively.

An EVOH resin having an ethylene content (ETB2) of 44 mol, %, a degree of saponification (SDB2) of 96.5%, a melt index (MIB2, at 190° C. under a load of 2.160 g) of 5.1 g/10 min, and a melting point of 153° C. was selected as EVOH B2. The phosphate radical content, the Na ion content, the K ion content and the Mg ion content of this EVOH were measured, and were 85 ppm, 70 ppm, 33 ppm and 25 ppm, respectively.

80 parts by weight of EVOH resin B1, 20 parts by weight of EVOH resin B2, and 0.016 parts by weight of hydrotalcite (DHT-4A from Kyowa Chemical Industry) were dry blended, and the resulting dry blend was pelletized through a 20 mmφ twin-screw extruder at 200° C., and dried at 80° C. under reduced pressure for 16 hours. The thus-pelletized EVOH resin composition was used herein. The EVOH resin composition had a melt index (MIB, at 190° C. under a load of 2,160 g) of 4.5 g/10 min, and a phosphate radical content, Na ion content, K ion content and Mg ion content of 93 ppm, 26 ppm, 12 ppm and 8 ppm, respectively. The melting points were 182° C. and 158° C., and the differential scanning calorimetry (DSC) gave two crystal fusion peaks (see FIG. 1). The particles of EVOH B2 were dispersed in the matrix of EVOH resin B1, and had a mean particle size of about 0.2 μm (see FIG. 6).

A two-resin, three-layered preform having the structure PES/EVOH/PES was obtained from the polyester resin and EVOH composition, prepared as described above, by coinjection molding with a ASB-50HT coinjection stretch-blow-molding machine from Nissei ASH. The temperature of the PES injection zone was 290° C., the temperature of the EVOH injection zone was 220° C., the temperature of the heated flow channel block in which the two resins, PES and EVOH, were combined was 260° C., the temperature of the injection mold core was 15° C., the temperature of the injection mold cavity was 15° C., and the cycle time was 40 seconds.

Next, the surface of the resulting preform was heated to 105° C., and subjected to stretch-blow molding into a two-resin, three-layered, coinjection stretch-blow molded bottle having a capacity of 350 ml, using a Corpoplast LB01 stretch-blow molding machine. In the body of the bottle, the inner layer of PES had a mean thickness of 150 μm, the interlayer of EVOH had a mean thickness of 15 μm, and the outer layer of PES had a mean thickness of 100 μm.

The inner and outer layers of PES were removed from the bottle body, and the density $D_A$, the intrinsic viscosity IVA, the melting point $T_MA$, the glass transition temperature $T_GA$, the terminal carboxyl content $C_A$ and the cyclic trimer content $CT_A$ were measured, and were 1.369 g/cm³, 0.80 dl/g, 252° C., 79° C., 26 microequivalents/g, and 0.73% by weight, respectively.

The EVOH was removed from the bottle body, and the melting point $T_MB$ and density $D_B$ were measured. The EVOH exhibited melting points $T_MB$ at 182° C. and 158° C., and had a density $D_B$ of 1.173 g/cm³. The EVOH B2 appeared as flattened particles dispersed in the EVOH resin composition layer (see FIG. 9).

The frequency of delamination of the bottles, the haze of the body of the bottles, and the oxygen and carbon dioxide transmission rates through the bottles were measured, and were 8%, 3.8%, 0.025 ml/bottle-day-atm, and 0.19 ml/bottle-day-atm, respectively.

The thermal stability of the EVOH composition was characterized as follows:

The EVOH composition and PES were molded into a two-resin, three-layered preform of PES/EVOH/PES, by coinjection molding with the same coinjection stretch-blow molding machine as above. The temperature of the PES injection zone was 290° C., the temperature of the EVOH injection zone was 230° C., and the temperature of the heated flow channel block in which the two resins, PES and EVOH, were combined was 265° C. The PES and EVOH were held at the conditioning temperature for 30 minutes in the heated flow channel block. The combined resins were then co-injected into a mold cavity. The temperature of the injection mold core was 15° C. and the temperature of the injection mold cavity was 15° C. The thus-prepared preform exhibited slight yellowing, but did not have fish eyes, and had a good appearance.

EXAMPLE 2

A thermoplastic polyester resin was prepared in the same manner as in Example 1. The same EVOH resins B1 and B2 as in Example 1 were used to prepare an EVOH composition. 70 parts by weight of EVOH resin B1, 30 parts by weight of the EVOH resin B2, and 0.016 parts by weight of hydrotalcite (DHT-4A from Kyowa Chemical Industry) were dry blended, and the resulting dry blend was pelletized through a 20 mmφ twin-screw extruder at 200° C., and dried at 80° C. under reduced pressure for 16 hours, in the same manner as in Example 1. The melt index (MIB, at 190° C. under a load of 2,160 g) of the EVOH composition was 4.7 g/10 min. Its phosphate radical content, Na ion content, K ion content and Mg ion content were measured, and were 92 ppm, 32 ppm, 15 ppm and 10 ppm, respectively. It exhibited melting points at 182° C. and 158° C., and its differential scanning calorimetry (DSC) exhibited two crystal fusion peaks. EVOH B2 was dispersed in a matrix of EVOH B1 and had a mean particle size of about 0.2 μm.

A two-resin, three-layered preform having the structure PES/EVOH/PES was prepared, as described in Example 1, from the polyester resin and the EVOH composition prepared as described above.

As in Example 1, the resulting preform was heated, and subjected to stretch-blow molding into a two-resin, three-layered, coinjection stretch-blow molded bottle having a capacity of 350 ml. In the body of the bottle, the inner layer of PES had a mean thickness of 150 μm, the interlayer of EVOH had a mean thickness of 15 μm, and the outer layer of PES had a mean thickness of 100 μm.

The inner and outer layers of PES were removed from the bottle body, and the density $D_A$, the intrinsic viscosity IVA, the melting point $T_MA$, the glass transition temperature $T_GA$, the terminal carboxyl content $C_A$ and the cyclic trimer content $CT_A$ were measured, and were 1.369 g/cm³, 0.80 dl/g, 252° C., 79° C., 25 microequivalents/g, and 0.72% by weight, respectively.

The EVOH was removed from the bottle body, and the melting point $T_MB$ and density $D_B$ were measured. The EVOH exhibited melting points $T_MB$ at 182° C. and 158° C., and had a density $D_B$ of 1.168 g/cm³.

The frequency of delamination of the bottles, the haze of the body of the bottles, and the oxygen and carbon dioxide transmission rates through the bottles were measured, and were 6%, 4.0%, 0.028 ml/bottle-day-atm, and 0.21 ml/bottle-day-atm, respectively.

As in Example 1, the EVOH composition and PES described above were molded into a two-resin, three-layered preform having the structure PES/EVOH/PES, by coinjection molding using the same coinjection stretch-blow molding machine as above. The temperature of the PES injection zone was 290° C., the temperature of the EVOH injection zone was 230° C., and the temperature of the heated flow channel block in which the two resins, PES and EVOH were combined was 265° C. The PES and EVOH were held at the conditioning temperature in the heated flow channel block for 30 minutes. The combined resins were then co-injected into a mold cavity. The temperature of the injection mold core was 15° C., and the temperature of the injection mold cavity was 15° C. The resulting preform was slightly yellowed, but did not have fish eyes, and had a good appearance.

COMPARATIVE EXAMPLE 1

A thermoplastic polyester resin was prepared in the same manner as in Example 1, and combined with only the EVOH resin B1 of Example 1. A two-resin, three-layered preform of PES/EVOH/PES was obtained by coinjection molding as in Example 1.

As in Example 1, the resulting preform was heated, and subjected to stretch-blow molding into a two-resin, three-layered, coinjection stretch-blow molded bottle having a capacity of 350 ml. In the body of the bottle, the inner layer of PES had a mean thickness of 149 μm, the EVOH layer had a mean thickness of 15 μm, and the outer layer of PES had a mean thickness of 101 μm.

The inner and outer layers of PES were removed from the bottle body, and the density $D_A$, the intrinsic viscosity IVA, the melting point $T_M A$, the glass transition temperature $T_G A$, the terminal carboxyl content $C_A$ and the cyclic trimer content $CT_A$ were measured, and were 1.368 g/cm³, 0.79 dl/g, 252° C., 79° C., 26 microequivalents/g, and 0.74% by weight, respectively.

The EVOH B1 was removed from the bottle body, and the melting point $T_M B1$ and density $D_{B1}$ were measured. The EVOH exhibited a melting point $T_M B1$ at 183° C., and had a density $DB_{B1}$ of 1.184 g/cm³.

The frequency of delamination of the bottles, the haze of the body of the bottles, and the oxygen and carbon dioxide transmission rates through the bottles were measured, and were 98%, 3.4%, 0.027 ml/bottle-day-atm, and 0.20 ml/bottle-day-atm, respectively.

The thermal stability of the EVOH B1 used was characterized as shown below. The EVOH B1 and PES were molded into a two-resin, three-layered preform having the structure PES/EVOH/PES, by coinjection molding using the same coinjection stretch-blow molding machine as above. The temperature of the PES injection zone was 290° C., the temperature of the EVOH injection zone was 230° C., and the temperature of the heated flow channel block in which the PES and EVOH were combined was 265° C. The PES and EVOH were held at the conditioning temperature in the heated flow channel block for 30 minutes. The combined resins were then co-injected into a mold cavity. The temperature of the injection mold core was 15° C., and the temperature of the injection mold cavity was 15° C. The resulting preform was slightly yellowed, but did not have fish eyes, and had a good appearance.

COMPARATIVE EXAMPLE 2

A thermoplastic polyester resin was prepared in the same manner as in Example 1. The same EVOH resin B1 was used as in Example 1. An EVOH having an ethylene content (ETB2) of 32 mol %, a degree of saponification (SDB2) of 96.5%, a melt index (MIB2, at 190° C. under a load of 2,160 g) of 3.8 g/10 min, and a melting point of 172° C. was used as EVOH resin B2. The phosphate radical content, the Na ion content, the K ion content and the Mg ion content of this EVOH were measured, and were 83 ppm, 70 ppm, 35 ppm and 25 ppm, respectively.

50 parts by weight of EVOH resin B1, 50 parts by weight of EVOH resin B2, and 0.016 parts by weight of hydrotalcite (DHT-4A from Kyowa Chemical Industry) were dry blended, and the resulting dry blend was pelletized through a 20 mmφ twin-screw extruder at 200° C., and dried at 80° C. under reduced pressure for 16 hours, in the same manner as in Example 1. The melt index (MIB, at 190° C. under a load of 2,160 g) of the EVOH composition was 3.8 g/10 min. Its phosphate radical content, Na ion content, K ion content and Mg ion content were measured, and were 89 ppm, 43 ppm, 21 ppm and 15 ppm, respectively. Its melting point was 181° C., and its differential scanning calorimetry (DSC) exhibited a single crystal fusion peak (see FIG. 2). The phase morphology of the EVOH composition was analyzed, and the two EVOH B2 resins B1 and B2 were found to be completely dissolved in each other and formed a single phase. A two-resin, three-layered preform of PES/EVOH/PES was prepared as in Example 1.

As in Example 1, the resulting preform was heated and subjected to stretch-blow molding into a two-resin, three-layered, coinjection stretch-blow molded bottle having a capacity of 350 ml. In the body of the bottle, the inner layer of PES had a mean thickness of 152 μm, the EVOH layer had a mean thickness of 14 μm, and the outer layer of PES had a mean thickness of 99 μm.

The inner and outer layers of PES were removed from the bottle body, and the density $D_A$, the intrinsic viscosity IVA, the melting point $T_M A$, the glass transition temperature $T_G A$, the terminal carboxyl content $C_A$ and the cyclic trimer content $CT_A$ were measured, and were 1.370 g/cm³, 0.80 dl/g, 252° C., 79° C., 27 microequivalents/g, and 0.73% by weight, respectively.

The EVOH was removed from the bottle body, and the melting point $T_M B$ and density $D_B$ were measured. The EVOH exhibited a melting points $T_M B$ at 181° C., and had a density $D_B$ of 1.179 g/cm³.

The frequency of delamination of the bottles, the haze of the body of the bottles, and the oxygen and carbon dioxide transmission rates through the bottles were measured, and were 7%, 2.8%, 0.051 ml/bottle-day-atm, and 0.37 ml/bottle-day-atm, respectively.

The thermal stability of the EVOH used was confirmed in the same manner as in Example 1. The two resins, EVOH and PES prepared as described above were molded into a two-resin, three-layered preform of PES/EVOH/PES, by coinjection molding using the same coinjection stretch-blow molding machine as above. The temperature of the PES injection zone was 290° C., the temperature of the EVOH injection zone was 230° C., and the temperature of the heated flow channel block in which the two resins, PES and EVOH, were combined was 265° C. The PES and EVOH were held at the conditioning temperature for 30 minutes. The PES and EVOH were held at the conditioning temperature in the heated flow channel block for 30 minutes. The combined resins were then co-injected into a mold cavity. The temperature of the injection mold core was 15° C., and the temperature of the injection mold cavity was 15° C. The resulting preform was brown, its EVOH layer had fish eyes and streaks, and was not uniform in thickness.

COMPARATIVE EXAMPLE 3

The same thermoplastic polyester resin and EVOH resin B1 as in Example 1, and the same EVOH resin B2 as in Comparative Example 2, were used. 80 parts by weight of the EVOH resin B1, 20 parts by weight of the EVOH resin B2, and 0.016 parts by weight of hydrotalcite (DHT-4A from Kyowa Chemical Industry) were dry blended, and the resulting dry blend was pelletized through a 20 mmφ twin-screw extruder at 200° C., and dried at 80° C. under reduced pressure for 16 hours, in the same manner as in Example 1. The melt index (HIB at 190° C. under a load of 2,160 g) of the EVOH composition was 3.9 g/10 min. Its phosphate radical content, Na ion content, K ion content and Mg ion content were measured, and were 93 ppm, 26 ppm, 13 ppm and 8 ppm, respectively. Its melting point was 182° C., and differential scanning Calorimetry (DSC) exhibited a single crystal fusion peak (see FIG. 3). The phase morphology of the EVOH B2 composition was analyzed, and the two EVOH resins B1 and B2 were found to be completely dissolved in each other and formed a single phase.

A two-resin, three-layered preform having the structure PES/EVOH/PES was obtained by coinjection molding the polyester resin and EVOH composition prepared in the manner described above, as in Example 1.

As in Example 1, the resulting preform was heated, and subjected to stretch-blow molding into a two-resin, three-layered, coinjection stretch-blow molded bottle having a capacity of 350 ml. In the body of the bottle, the inner layer of PES had a mean thickness of 152 μm, the EVOH layer had a mean thickness of 15 μm, and the outer layer of PES had a mean thickness of 100 μm.

The inner and outer layers of PES were removed from the bottle body, and the density $D_A$, the intrinsic viscosity IVA, the melting point $T_MA$, the glass transition temperature $T_GA$, the terminal carboxyl content $C_A$ and the cyclic trimer content $CT_A$ were measured, and were 1.369 g/cm$^3$, 0.80 dl/g. 252° C., 79° C. 27 microequivalents/g, and 0.72% by weight, respectively.

The EVOH was removed from the bottle body, and the melting point $T_MB$ and density $D_B$ were measured. The EVOH exhibited a melting point $T_MB$ at 182° C., and had a density $D_B$ of 1.181 g/cm$^3$.

The frequency of delamination of the bottles, the haze of the body of the bottles, and the oxygen and carbon dioxide transmission rates through the bottles were measured, and were 27%, 3.0%, 0.039 ml/bottle-day-atm, and 0.28 ml/bottle-day-atm, respectively.

The thermal stability of the EVOH used was confirmed in the same manner as in Example 1. The two resins, EVOH and PES prepared as described above were molded into a two-resin, three-layered preform of PES/EVOH/PES, by coinjection molding using the same coinjection stretch-blow molding machine as above. The temperature of the PES injection zone was 290° C., the temperature of the EVOH injection zone was 230° C., and the temperature of the heated flow channel block in which the two resins, PES and EVOH, were combined was 265° C. The PES and EVOH were held at the conditioning temperature for 30 minutes. The PES and EVOH were held at the conditioning temperature in the heated flow channel block for 30 minutes. The combined resins were then co-injected into a mold cavity. The temperature of the injection mold core was 15° C., and the temperature of the injection mold cavity was 15° C. The resulting preform was somewhat brown, its EVOH layer had fish eyes and streaks, and was not uniform in thickness.

COMPARATIVE EXAMPLE 4

The same thermoplastic polyester resin and EVOH resin B1 were used as in Example 1. An EVOH having an ethylene content (ETB2) of 80 mol %, a degree of saponification (SDB2) of 90.0%, a melt index (MIB2, at 190° C. under a load of 2,160 g) of 38.0 g/10 min, and a melting point of 109° C. was selected as the EVOH resin B2. The phosphate radical content, the Na ion content, the K ion content and the Mg ion content of EVOH B2 were were 76 ppm, 68 ppm, 32 ppm and 18 ppm, respectively.

80 parts by weight of the EVOH resin B1, 20 parts by weight of the EVOH resin B2, and 0.016 parts by weight of hydrotalcits (DHT-4A from Kyowa Chemical Industry) were dry blended, and the resulting dry blend was pelletized through a 20 mmφ twin-screw extruder at 200° C., and dried at 80° C. under reduced pressure for 16 hours, in the same manner as in Example 1. The melt index (MIB, at 190° C. under a load of 2,160 g) of the EVOH composition was 6.2 g/10 min. The phosphate radical content, Na ion content, K ion content and Mg ion content were 91 ppm, 26 ppm, 12 ppm and 7 ppm, respectively. It exhibited melting points at 183° C. and 106° C., and the differential scanning calorimetry (DSC) exhibited two crystal fusion peaks (see FIG. 4).

The particles of EVOH B2 were dispersed in a matrix of EVOH B11 and had a mean particle size of about 1 μm (see FIG. 7).

A two-resin, three-layered preform having the structure PES/EVOH/PES was obtained by coinjection molding the polyester resin and EVOH composition prepared in the manner described above, and as in Example 1.

As in Example 1, the resulting preform was heated, and subjected to stretch-blow molding into a two-resin, three-layered, coinjection stretch-blow molded bottle having a capacity of 350 ml. In the body of the bottle, the inner layer of PES had a mean thickness of 153 μm, the EVOH layer had a mean thickness of 16 μm, and the outer layer of PES had a mean thickness of 96 μm.

The inner and outer layers of PES were removed from the bottle body, and the density $D_A$, the intrinsic viscosity IVA, the melting point $T_MA$, the glass transition temperature $T_GA$, the terminal carboxyl content $C_A$ and the cyclic trimer content $CT_A$ were measured, and were 1.369 g/cm$^3$, 0.79 dl/g, 252° C., 79° C., 25 microequivalents/g, and 0.72% by weight, respectively.

The EVOH was removed from the bottle body, and the melting point $T_MB$ and density $D_B$ were measured. The EVOH exhibited melting points $T_MB$ at 183° C. and 106° C., and had a density $D_B$ of 1.139 g/cm$^3$.

The frequency of delamination of the bottles, the haze of the body of the bottles, and the oxygen and carbon dioxide transmission rates through the bottles were measured, and were 58%, 10.2%, 0.120 ml/bottle-day-atm, and 0.92 ml/bottle-day-atm, respectively.

The two resins, EVOH and PES, prepared as described above, were molded into a two-resin, three-layered preform of PES/EVOH/PES, by coinjection molding using the same coinjection stretch-blow molding machine as above. The temperature of the PES injection zone was 290° C., the temperature of the EVOH injection zone was 230° C., and the temperature of the heated flow channel block in which the two resins, PES and EVOH, were combined was 265° C. The PES and EVOH were held at the conditioning temperature for 30 minutes. The PES and EVOH were held at the conditioning temperature in the heated flow channel block for 30 minutes. The combined resins were then co-injected into a mold cavity. The temperature of the injection mold core was 15° C., and the temperature of the injection mold cavity was 15° C. The resulting preform was extremely cloudy and somewhat yellow, but did not have fish eyes.

COMPARATIVE EXAMPLE 5

The same thermoplastic polyester resin, EVOH resin B1, and EVOH resin B2 as in Example 1 were prepared. 50 parts by weight of the EVOH resin B1, 50 parts by weight of the EVOH resin B2, and 0.016 parts by weight of hydrotalcite (DHT-4A from Kyowa Chemical industry) were dry blended, and the resulting dry blend was pelletized through a 20 mmφ twin-screw extruder at 200° C., and dried at 80° C. under reduced pressure for 16 hours, in the same manner as in Example 1. The melt index (MIB, at 190° C. under a load of 2,160 g) of the EVOH composition was 4.9 g/10 min. The phosphate radical content, Na ion content, K ion content and Mg ion content were 89 ppm, 43 ppm, 21 ppm and 15 ppm, respectively. It exhibited melting points at 183° C. and 158° C., and differential scanning calorimetry (DSC) gave two crystal fusion peaks (see FIG. 5). The dispersion morphology of the EVOH composition was analyzed, and it was determined that particles of EVOH resin B1 were dispersed in a matrix of EVOH resin B2. The size of the EVOH B1 particles was irregular (see FIG. 8).

A two-resin, three-layered preform having the structure PES/EVOH/PES was obtained by coinjection molding the polyester resin and EVOH composition prepared in the manner described above, and as in Example 1.

As in Example 1, the resulting preform was heated, and subjected to stretch-blow molding into a two-resin, three-layered, coinjection stretch-blow molded bottle having a capacity of 350 ml. In the body of the bottle, the inner layer of PES had a mean thickness of 149 μm, the EVOH layer had a mean thickness of 15 μm, and the outer layer of PES had a mean thickness of 101 μm.

The inner and outer layers of PES were removed from the bottle body, and the density $D_A$, the intrinsic viscosity IVA, the melting point $T_M A$, the glass transition temperature $T_G A$, the terminal carboxyl content $C_A$ and the cyclic trimer content $CT_A$ were measured, and were 1.370 g/cm$^3$, 0.79 dl/g, 252° C., 79° C., 26 microequivalents/g, and 0.73% by weight, respectively.

The EVOH was removed from the bottle body, and the melting point $T_M B$ and density $D_B$ were measured. The EVOH exhibited melting points $T_M B$ at 183° C. and 158° C. and had a density $D_B$ of 1.159 g/cm$^3$.

The frequency of delamination of the bottles, the haze of the body of the bottles, and the oxygen and carbon dioxide transmission rates through the bottles were measured, and were 6%, 4.4%, 0.063 ml/bottle-day-atm, and 0.45 ml/bottle-day-atm, respectively.

The two resins, EVOH and PES, prepared as described above, were molded into a two-resin, three-layered preform of PES/EVOH/PES, by coinjection molding using the same coinjection stretch-blow molding machine as above. The temperature of the PES injection zone was 290° C., the temperature of the EVOH injection zone was 230° C., and the temperature of the heated flow channel block in which the two resins, PES and EVOH, were combined was 265° C. The PES and EVOH were held at the conditioning temperature for 30 minutes. The PES and EVOH were held at the conditioning temperature in the heated flow channel block for 30 minutes. The combined resins were then co-injected into a mold cavity. The temperature of the injection mold core was 15° C., and the temperature of the injection mold cavity was 15° C. The resulting preform was somewhat brown, and the EVOH layer had a few fish eyes.

TABLE 2

Test Data of Bottles

|  | Frequency of Delamination % | Oxygen Transmission Rate *1) | Carbon Dioxide Transmission Rate *1) | Haze % |
|---|---|---|---|---|
| Example 1 | 8 | 0.025 | 0.19 | 3.8 |
| Example 2 | 6 | 0.028 | 0.21 | 4.0 |
| Comparative Example 1 | 98 | 0.027 | 0.20 | 3.4 |
| Comparative Example 2 | 7 | 0.051 | 0.37 | 2.8 |
| Comparative Example 3 | 27 | 0.039 | 0.28 | 3.0 |
| Comparative Example 4 | 58 | 0.120 | 0.92 | 10.2 |
| Comparative Example 5 | 6 | 0.063 | 0.45 | 4.4 |

*1) ml/bottle · day · atm

The samples prepared in Examples 1 and 2 and Comparative Examples 1 to 5 were analyzed and tested, and the results of these analyses and tests presented in Tables 1 and 2.

As shown in Tables 1 and 2, the coinjection stretch-blow molded containers of Examples 1 and 2, according to the present invention, all had good impact delamination resistance, good gas-barrier properties against oxygen and carbon dioxide, and good transparency. In addition, the resins in Examples 1 and 2 exhibited good thermal stability in the melt.

In contrast, when a single EVOH resin was used, as in Comparative Example 1, the impact delamination resistance of the bottles produced was poor, even though the gas-barrier properties and transparency of the bottles, and the thermal stability of the resin used was good.

In the EVOH resin compositions of Comparative Examples 2 and 3, the difference in the ethylene content between EVOH B1 and EVOH B2 was small, and the two resins therefore exhibit only a small difference in melting point. As a result, the EVOH resin compositions both had a single crystal fusion peak in the DSC. In addition, the two resins B1 and B2 are completely miscible with each other

TABLE 1

Analyzed and tested Data of EVOH Resin Compositions

| | Ethylene Content ETB1 ETB2 mol % | Degree of Saponification SDB1 SDB2 % | Melt Index MIB1 MIB2 g/10 min | Melting Point TMB1 TMB2 °C. | Amount Blended wt. pts. | Melt Index MIB g/10 min | Mean Particle Size of B2 Particles μm | Melting Point TMb °C. |
|---|---|---|---|---|---|---|---|---|
| Example 1 | 32 | 99.7 | 4.0 | 183 | 80 | 4.5 | 0.2 | 182 |
|  | 44 | 96.5 | 5.1 | 153 | 20 |  | (B1:matrix) | 158 |
| Example 2 | 32 | 99.7 | 4.0 | 183 | 70 | 4.7 | 0.2 | 182 |
|  | 44 | 96.5 | 5.1 | 153 | 30 |  | (B1:matrix) | 158 |
| Comparative Example 1 | 32 | 99.7 | 4.0 | 183 | 100 | 4.0 | (B1 only) | 183 (single peak) |
| Comparative Example 2 | 32 | 99.7 | 4.0 | 183 | 50 | 3.8 | (single phase) | 181 (single peak) |
|  | 32 | 96.5 | 3.8 | 172 | 50 |  |  |  |
| Comparative Example 3 | 32 | 99.7 | 4.0 | 183 | 80 | 3.9 | (single phase) | 182 (single peak) |
|  | 32 | 96.5 | 3.8 | 172 | 20 |  |  |  |
| Comparative Example 4 | 32 | 99.7 | 4.0 | 183 | 80 | 6.2 | 1 | 183 |
|  | 80 | 90.0 | 38.0 | 109 | 20 |  | (B1:matrix) | 106 |
| Comparative Example 5 | 32 | 99.7 | 4.0 | 183 | 50 | 4.9 | uneven | 183 |
|  | 44 | 96.5 | 5.1 | 153 | 50 |  | (B2:matrix) | 158 | and formed a single phase. In other words, resin B1 did not form a matrix in which particles of resin B2 were dispersed. The bottles of Comparative Example 2 had good impact delamination resistance and good transparency. However, the EVOH composition used for these bottles contained 50 g by weight of EVOH B2 which has a low degree of saponification. As a result, the oxygen and carbon dioxide transmission rates through the bottles of Comparative Example 2 was 2 times larger than that through the bottles of Examples 1 and 2. In addition, the thermal stability of the EVOH resin composition used in Comparative Example 2 was poor.

In Comparative Example 3, the amount of B2 was smaller than in Comparative Example 2. Consequently, the impact delamination resistance of the bottles of Comparative Example 3 was poor. In addition, the gas-barrier properties and the thermal stability of the bottles of Comparative Example 3 are poor when compared with those of Examples 1 and 2.

In the EVOH resin composition of Comparative Example 4, the difference in the ethylene content, the degree of saponification and the melt index between EVOH B1 and EVOH B2 are all too large. In addition, the size of the particles of B2 in the EVOH composition is also large. As a result, the impact delamination resistance, the gas-barrier properties and the transparency of the bottles of Comparative Example 4 were all poor.

The starting EVOH B1 and EVOH B2 for the resin composition in Comparative Example 5 are both the same as in Examples 1 and 2. However, in Comparative Example 5, the two resins were blended in a ratio of 1/1, and therefore particles of resin B2 were not dispersed in the composition. As a result, the gas-barrier properties of the bottles of Comparative Example S were extremely poor, and the thermal stability of the resin composition was also poor, though the impact delamination resistance and the transparency of the bottles were good.

As described above, the EVOH resin composition of the present invention provides coinjection stretch-blow molded containers having good impact delamination resistance, good gas-barrier properties, good transparency and good thermal stability of the resin melts. Accordingly, the containers of the present invention are suitable for holding beverages, foods, cosmetics, etc.

While the Invention has been described in detail and with reference to specific embodiments thereof, it will be apparent to one skilled in the art that various changes and modifications can be made therein without departing from the spirit and scope thereof.

Obviously, numerous modifications and variations of the present invention are possible in light of the above teachings. It is therefore to be understood that within the scope of the appended claims, the invention may be practiced otherwise than as specifically described herein.

The priority document of the present application, Japanese patent application 19587/2000 filed Jan. 28, 2000, is incorporated herein by reference.

What is claimed is:

1. A container comprising:
   at least one layer comprising a thermoplastic polyester, and
   at least one layer comprising a mixture of two ethylene-vinyl alcohol copolymers B1 and B2,
   wherein said mixture of B1 and B2 has a morphology in which particles of B2 are dispersed in B1, said mixture of B1 and B2 exhibits at least two crystal fusion peaks in its differential scanning calorimetry (DSC) and satisfies the following formulae (1) to (7):

$$60/40 \leq WB1/WB2 \leq 90/10 \tag{1}$$

$$25 \leq ETB1 \leq 40 \tag{2}$$

$$99 \leq SDB1 \tag{3}$$

$$35 \leq ETB2 \leq 48 \tag{4}$$

$$92 \leq SDB2 \leq 99 \tag{5}$$

$$10 \leq ETB2-ETB1 \leq 23 \tag{6}$$

$$1 \leq SDB1-SDB2 \leq 8 \tag{7}$$

and,
   WB1 is the amount by weight of B1 in the mixture,
   WB2 is the amount by weight of B2 in the mixture,
   ETB1 is the mol % ethylene in B1,
   ETB2 is the mol % ethylene in B2,
   SDB1 is the % saponification of B1, and
   SDB2 is the % saponification of B2.

2. The container of claim 1, wherein one layer comprising B1 and B2 is contacted on each face thereof with a layer of said thermoplastic polyester.

3. The container of claim 1, wherein pellets of the mixture are injection-molded, and the particles of B2 dispersed in B1 have a mean particle size of at most 0.8 μm.

4. The container of claim 1, wherein B1 and B2 have melt indices (in units of g/10 min, measured at 190° C. under a load of 2160 g) MIB1 and MIB2, respectively, which satisfy formula (8):

$$0.1 \leq MIB1/MIB2 \leq 10 \tag{8}$$

5. The container of claim 1, wherein the thermoplastic polyester has an intrinsic viscosity IVA (in units of dl/g) which satisfies the following formula (9) and the mixture of B1 and B2 has a melt index MIB (in units of g/10 min, measured at 190° C. under a load of 2160 g) which satisfies the following formula (10):

$$0.60 \leq IVA \leq 0.90 \tag{9}$$

$$0.1 \leq MIB \leq 10 \tag{10}$$

6. The container of claim 1, wherein the body of said container has a haze value of at most 5%.

7. The container of claim 1, wherein said container is a stretch-blow molded container.

8. The container of claim 7, wherein the capacity of said container is at most 800 ml.

9. A preform for a container comprising:
   at least one layer comprising a thermoplastic polyester, and
   at least one layer comprising a mixture of two ethylene-vinyl alcohol copolymers B1 and B2,
   wherein said mixture of B1 and B2 has a morphology in which particles of B2 are dispersed in B1, said mixture of B1 and B2 exhibits at least two crystal fusion peaks in its differential scanning calorimetry (DSC) and satisfies the following formulae (1) to (7):

$$60/40 \leq WB1/WB2 \leq 90/10 \tag{1}$$

$$25 \leq ETB1 \leq 40 \tag{2}$$

$$99 \leq SDB1 \tag{3}$$

$$35 \leq ETB2 \leq 48 \tag{4}$$

$$92 \leq SDB2 \leq 99 \tag{5}$$

$$10 \leq ETB2-ETB1 \leq 23 \tag{6}$$

$$1 \leq SDB1-SDB2 \leq 8 \tag{7}$$

and,
  WB1 is the amount weight of B1 in the mixture,
  WB2 is the amount by weight of B2 in the mixture,
  ETB1 is the mol % ethylene in B1,
  ETB2 is the mol % ethylene in B2,
  SDB1 is the % saponification of B1, and
  SDB2 is the % saponification of B2.

10. The preform of claim 9, wherein one layer comprising B1 and B2 is contacted on each face thereof with a layer of said thermoplastic polyester.

11. The preform of claim 9, wherein pellets of the mixture are injection-molded, and the particles of B2 dispersed in B1 have a mean particle size of at most 0.8 μm.

12. The preform of claim 9, wherein B1 and B2 have melt indices (in units of g/10 min, measured at 190° C. under a load of 2160 g) MIB1 and MIB2, respectively, which satisfy formula (8):

$$0.1 \leq MIB1/MIB2 \leq 10 \tag{8}$$

13. The preform of claim 9, wherein the thermoplastic polyester has an intrinsic viscosity IVA (in units of dl/g) which satisfies the following formula (9) and the mixture of B1 and B2 has a melt index MIB (in units of g/10 min, measured at 190° C. under a load of 2160 g) which satisfies the following formula (10):

$$0.60 \leq IVA \leq 0.90 \tag{9}$$

$$0.1 \leq MIB \leq 10 \tag{10}$$

* * * * *